(12) United States Patent
Takata

(10) Patent No.: US 8,888,308 B2
(45) Date of Patent: Nov. 18, 2014

(54) LIGHTING DEVICE, DISPLAY DEVICE AND TELEVISION DEVICE

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 186 days.

(21) Appl. No.: 13/698,310

(22) PCT Filed: Apr. 15, 2011

(86) PCT No.: PCT/JP2011/059367
§ 371 (c)(1),
(2), (4) Date: Nov. 16, 2012

(87) PCT Pub. No.: WO2011/148733
PCT Pub. Date: Dec. 1, 2011

(65) Prior Publication Data
US 2013/0057779 A1    Mar. 7, 2013

(30) Foreign Application Priority Data
May 26, 2010 (JP) ................. 2010-120858

(51) Int. Cl.
*G09F 13/04* (2006.01)
*G02F 1/1333* (2006.01)
*F21V 8/00* (2006.01)
*G02F 1/1335* (2006.01)

(52) U.S. Cl.
CPC ........ *G02F 1/133308* (2013.01); *G02B 6/0073* (2013.01); *G02F 2001/133311* (2013.01); *G02B 6/009* (2013.01); *G02B 6/0083* (2013.01); *G02F 1/133608* (2013.01); *G02F 2001/133612* (2013.01); *G02F 1/133603* (2013.01); *G02F 2001/133314* (2013.01)
USPC ............... 362/97.2; 362/612; 362/217.13

(58) Field of Classification Search
USPC ............ 362/97.1, 97.2, 612, 632, 633, 217.1, 362/217.13, 217.17, 249.02, 362
See application file for complete search history.

(56) References Cited

FOREIGN PATENT DOCUMENTS

| | | |
|---|---|---|
| JP | 58-5383 U | 1/1983 |
| JP | 5-61908 U | 8/1993 |
| JP | 10-649 A | 1/1998 |
| JP | 11-133394 A | 5/1999 |
| JP | 2005-331911 A | 12/2005 |

OTHER PUBLICATIONS

An International Search Report and Written Opinion, dated May 24, 2011, issued in International Application No. PCT/JP2011/059367.

*Primary Examiner* — Vip Patel
(74) *Attorney, Agent, or Firm* — Lowe Hauptman & Ham, LLP

(57) ABSTRACT

It is an object of present invention to improve wiring workability in a lighting device and to prevent the entry of dust or the like into the device. A backlight unit according to the present technology includes a chassis having hole portions, LEDs housed in the chassis as light sources, relaying and connecting part electrically connected to the LEDs from outside the chassis through the hole portion and relaying electric power supply to the LEDs, and a covering member covering a clearance between the hole portions and the relaying and connecting parts inserted therethrough.

20 Claims, 17 Drawing Sheets

FIG.1
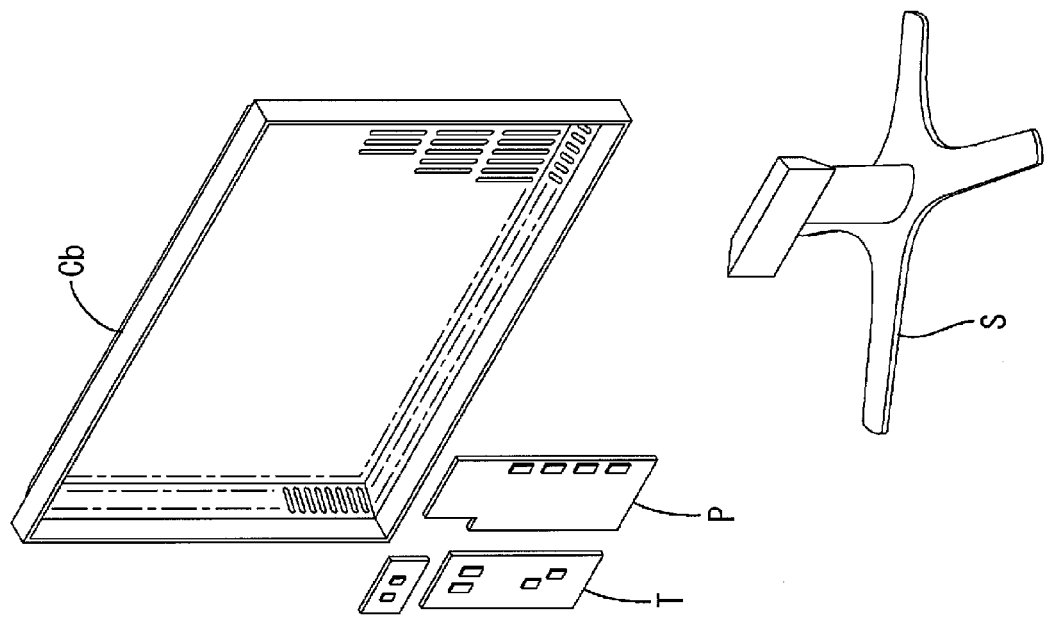
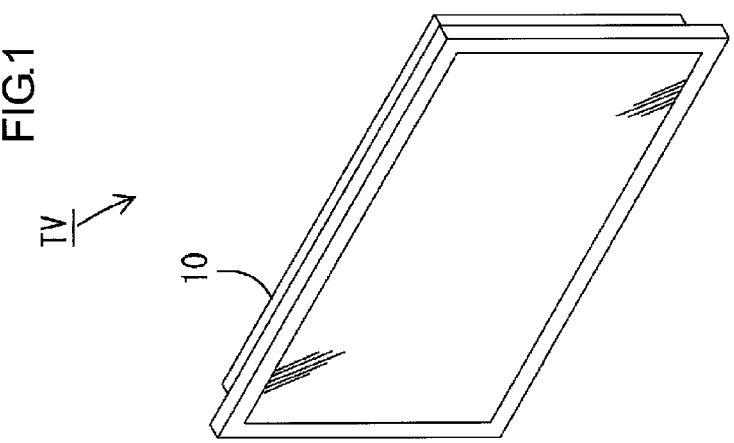
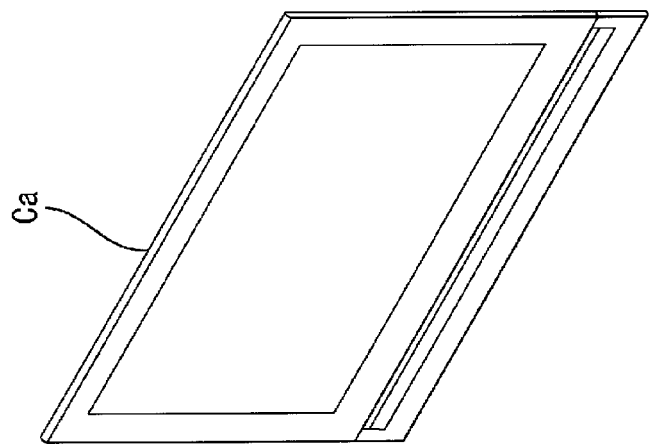

US 8,888,308 B2

LIGHTING DEVICE, DISPLAY DEVICE AND TELEVISION DEVICE

RELATED APPLICATIONS

The present application is a National Stage of International Application No. PCT/JP2011/059367 filed Apr. 15, 2011 and claims priority from, Japanese Application No. 2010-120858 filed May 26, 2010.

TECHNICAL FIELD

The present invention relates to a lighting device, a display device, and a television device.

BACKGROUND ART

In recent years, display elements of an image display device, such as a television device, are in a transition from the conventional cathode-ray tube to flat display panel, such as liquid crystal panel or plasma display panel, making it possible to provide a flat image display device. The liquid crystal panel of a liquid crystal display device does not emit light by itself, and therefore the display device requires a backlight unit as a separate lighting device. The backlight unit may be generally categorized by mechanism into a direct type and an edge light type. In order to further reduce the thickness of the liquid crystal display device, it is preferable to use an edge light backlight unit, as described in Patent Document 1 indicated below.

The backlight unit described in Patent Document 1 includes a light guide plate, an LED facing an end portion of the light guide plate, an LED board on which the LED is mounted, and a lead frame electrically connecting the LED board to an external power supply circuit board. The lead frame includes a clip-like terminal on one end to be soldered to the LED board, and a flat-plate terminal on the other end to be soldered to the external power supply circuit board. Thus, the lead frame relays the supply of electric power to the LED board.

Patent Document 1: Japanese Unexamined Patent Publication No. 1999-133394

Problem to be Solved by the Invention

In the backlight unit of the above configuration, the lead frame of a metal plate material is soldered to the LED board and the power supply circuit board. Thus, if the temperature environment within the backlight unit is greatly changed, a relative displacement may be caused between the power supply circuit board and the LED board due to difference in their coefficients of thermal expansion. As a result, the soldered portions may be stressed and crack, possibly causing a decrease in electric connection reliability.

The problem may be overcome by using a flexible electric wire and connectors provided at the ends of the wire, instead of the lead frame. However, in this case, workability in attaching and detaching operations may be adversely affected. Further, dust or the like may enter the chassis from the outside via a hole portion for running the electric wire in and out of the chassis.

DISCLOSURE OF THE PRESENT INVENTION

The present invention was made in view of the above circumstances, and an object of the present invention is to improve workability and prevent the entry of dust or the like.

Means for Solving the Problem

A lighting device according to the present invention includes a chassis having a hole, a light source housed in the chassis, a relaying and connecting part electrically connected to the light source through the hole from outside the chassis and relaying electric power supply to the light source, and a covering member covering a clearance between the hole and the relaying and connecting part inserted therein.

In this way, the relaying and connecting part is inserted through the hole portion of the chassis from outside the chassis, and the relaying and connecting part is electrically connected to the light source in the chassis and relays the supply of electric power to the light source while the clearance between the hole and the relaying and connecting part is covered by the covering member.

If an electric wire and a connector provided at the end thereof is used for electrical connection and electric power supply to the light source, as is conventionally done, it is necessary to connect the connector to the light source within the chassis while running the electric wire in and out of the chassis through a hole of the chassis, resulting in low attaching workability. In addition, if the connector is necessary to be disconnected from the light source disposed in the chassis for a repair or the like, it is likely that major portion of the lighting device will have to be disassembled, thereby adversely affecting detaching workability. Further, the hole of the chassis is conventionally dimensioned such that a sufficient clearance is provided between the electric wire and the hole for allowing assembly tolerance of the constituent parts of the lighting device or ensuring workability in passing the electric wire. Through the clearance, dust or the like may enter the chassis from outside, and this may adversely affect the optical performance of the lighting device.

In this respect, according to the present invention, the relaying and connecting part can be electrically connected to the light source in the chassis to supply electric power to the light source by inserting the relaying and connection part through the hole of the chassis. Thus, high attaching workability can be obtained. In addition, if the relaying and connecting part is electrically disconnected from the light source for a repair or the like, the relaying and connecting part can be simply detached from the chassis through the hole. Thus, high detaching workability can also be obtained. Furthermore, even if the clearance is provided between the hole of the chassis and the relaying and connecting part inserted therein for allowing assembly tolerance or ensuring insertion workability of the relaying and connecting part, the clearance is covered and closed by the covering member. Thus, the entry of external dust or the like into the chassis via the clearance between the hole portion and the relaying and connecting part is less likely to occur.

Preferable embodiments of the present invention may have the following configurations.

(1) The relaying and connecting part may include a flexible electric wire and a connector disposed at an end of the electric wire. The connector may be inserted in the hole. In this way, by inserting the connector disposed at the end of the electric wire through the hole of the chassis, electrical connection to the light source in the chassis can be established. Because the electric wire is flexible, high workability can be obtained in inserting or removing the connector into or out of the hole. Therefore, excellent workability can be obtained.

(2) The covering member may be integrally provided to the connector. In this way, the clearance between the hole and the connector is covered and closed by the covering member as the connector is inserted through the hole. Thus, better attaching workability can be obtained.

(3) The covering member may have a ring shape surrounding the connector and be fitted to the connector. In this way, by fitting the ring-shaped covering member to the connector, the covering member can be easily integrated with the connector.

(4) The connector may include a holding portion locked on a hole edge of the hole to hold the connector onto the chassis. In this way, the connector can be stably held onto the chassis by the holding portion.

(5) The covering member may be abutted on the hole edge on a side opposite to a side on which the holding portion is locked to sandwich the hole edge between the covering member and the holding portion. In this way, by sandwiching the hole edge of the hole between the holding portion and the covering member, the covering member is contacted closely to the hole edge of the hole and the connector is stably held onto the chassis. Thus, the entry of dust or the like into the hole can be prevented in a more preferred manner.

(6) The covering member may be made of an elastic material. In this way, the covering member can be elastically contacted with the hole and the relaying and connecting part. Thus, high contact property can be obtained and the entry of dust or the like via the clearance between the hole and the relaying and connecting part can be prevented in a more preferred manner.

(7) The covering member may be made of a rubber material. In this way, higher contact property can be obtained with respect to the hole and the relaying and connecting part. Therefore, the entry of dust or the like can be prevented in a more preferred manner. Further, the manufacturing cost of the covering member can be decreased.

(8) The covering member may have a ring shape surrounding the hole. In this way, the hole can be reliably covered along the entire circumference of the hole by the covering member of the ring shape surrounding the hole. Thus, the entry of dust or the like can be more reliably prevented.

(9) The covering member may have light blocking property. In this way, the light within the chassis can be prevented from leaking to the outside via the hole.

(10) The lighting device may further include a light source side connector arranged in the chassis and connected to the light source and facing the hole. The relaying and connecting part may be fitted and connected to the light source side connector through the hole. In this way, as the relaying and connecting part is inserted through the hole, the relaying and connecting part is fitted to and connected to the light source side connector facing the hole. Thus, better workability can be obtained.

(11) The relaying and connecting part may have a connection portion that is connected to the light source side connector and the light source side connector may have a concave shape conforming to the connection portion. In this way, because the light source side connector disposed in the chassis is concave, the space occupied by the light source side connector in the chassis can be decreased compared with a case where the light source side connector is convex. Thus, the size of the lighting device can be decreased in a preferred manner.

(12) The lighting device may further include a light source board having the light source mounted thereon. The light source side connector may be mounted on the light source board. In this way, both of the light source and the light source side connector mounted on the light source board can be disposed at respective predetermined positions by disposing the light source board in the chassis. Thus, excellent workability can be obtained.

(13) The light source and the light source side connector may be mounted on a common surface of the light source board. In this way, the light source board of the single-side mount type can be used, reducing the manufacturing cost of the light source board.

(14) The light source may include a plurality of light sources. The light source board may have an elongated shape having the light sources disposed along a long side thereof, and the light source side connector may be disposed at an end portion of the light source board in the long side direction. In this way, compared with a case where the light source side connector is disposed at the center of the light source board in the long side direction, the light source side connector is hardly visually recognized as a dark area. Thus, uneven brightness can be prevented in a preferred manner.

(15) The lighting device may further include a light guide member having an end portion disposed to face the light source. In this way, the light emitted from the light source is incident on the end portion of the light guide member facing the light source and is then guided to a light output side to be output.

(16) The lighting device may further include a light source board having the light source mounted thereon. The light source board may include a light source mount surface facing the end portion of the light guide member. In this way, by arranging the light source board such that the light source mount surface faces the end portion of the light guide member, the light source can be disposed to face the end portion of the light guide member. Thus, excellent workability can be obtained.

(17) The light source board may have an elongated shape extending along the end portion of the light guide member, and the light source may include a plurality of light sources and the light sources may be disposed along a long side of the light source board. In this way, because the light sources are disposed along the end portion of the light guide member, the light from the light sources can be efficiently incident on the end portion of the light guide member.

(18) The light source side connector connected to the light source and facing the hole may be mounted on the light source board, and the relaying and connecting part may be fitted and connected to the light source side connector through the hole. In this way, if the light source board is disposed in the chassis, the light source mounted on the light source board and also the light source side connector connected to the light source can be disposed at a predetermined position. Thus, excellent workability can be obtained. As the relaying and connecting part is inserted into the hole, the relaying and connecting part can be fitted and connected to the light source side connector facing the hole in the chassis. Thus, better workability can be obtained.

(19) The light source side connector may be mounted on the light source mount surface of the light source board. In this way, the light source board of the single-side mount type may be used, reducing the manufacturing cost of the light source board.

(20) The light source side connector may be displaced from a light source group including the light sources disposed on the light source board along the long side thereof with respect to a short side of the light source board. In this way, compared with a case where the light source side connector is displaced from the light source group with respect to the long side direction of the light source board, the size of the light source board can be decreased with respect to the long side direction.

(21) The light source side connector may be disposed along the short side of the light source board with respect to the light sources of the light source group. In this way, compared with a case where the light source side connector is displaced from the light source group with respect to the short side direction and from the light sources of the light source group with respect to the long side direction, the distance between the light sources and the light source side connector can be decreased. Thus, when the light sources and the light source side connector are connected by a wiring pattern, for example, the length of the wiring pattern can be decreased.

(22) The light source side connector may be disposed along the short side with respect to one of the light sources included in the light source group that is located at a distal end of the long side of the light source board. In this way, compared with a case where the light source side connector is disposed on the light source board closer to the center than the outer-most light source located at a distal end of the long side of the light source board, the distance between the outer-most light source and the light source side connector can be decreased. Thus, if the light sources and the light source side connector are connected by a wiring pattern, for example, the length of the wiring pattern can be decreased. Further, compared with a case where the light source side connector is disposed on the light source board even closer to the end than the outer-most light source in the long side direction, the size of the light source board can be decreased with respect to the longitudinal direction.

(23) The light source board may have two long sides and the light sources may be disposed closer to one of the long sides. The light source side connector may be disposed closer to another one of the long sides. In this way, the light sources and the light source side connector can be efficiently disposed on the light source board at positions mutually displaced in the short side direction.

(24) The light source side connector may be disposed on a side opposite to a light output side of the light guide member with respect to the light source. In this way, the light source side connector is hardly visually recognized as a dark area. Therefore, uneven brightness can be prevented in a preferred manner.

(25) The light source side connector may be disposed at an end portion of the light source board in the long side direction. In this way, compared with a case where the light source side connector is disposed at the center of the light source board in the long side direction, the light source side connector is hardly visually recognized as a dark area. Therefore, uneven brightness can be prevented in a preferred manner.

(26) The light source side connector may be disposed at each end portion of the light source board in the long side direction. The relaying and connecting part may include at least two relaying and connecting parts that are disposed to be separated from each other in the long side direction and corresponding to each of the light source side connectors that are disposed at the end portions of the light source board. In this way, the light sources mounted on the light source board can be driven by using the relaying and connecting parts disposed at each end portion of the light source board in the long side direction as the input side and the output side, respectively. Because the light source side connectors and the relaying and connecting parts are disposed at the end portions of the light source board in the long side direction, the distance between the outer-most light sources in the long side direction of the light source board and the light source side connectors can be decreased. Thus, if the light sources and the light source side connectors are connected by a wiring pattern, for example, an unnecessarily long wiring pattern can be prevented.

(27) The chassis may include a bottom portion on a side opposite to the light output side of the light guide member, and the hole may be formed in the bottom portion. In this way, because the hole is formed in the bottom portion disposed on the opposite side to the light output side of the light guide member, the hole and the relaying and connecting part inserted therein are hardly visually recognized as dark areas. Thus, uneven brightness can be prevented in a preferred manner.

(28) The chassis may include a side portion rising from an outer end of the bottom portion and disposed to face the end portion of the light guide member, and the light source may be attached to the side portion. In this way, the light source can be disposed to face the end portion of the light guide member by attaching the light source to the side portion. Thus, excellent workability can be obtained.

(29) The bottom portion of the chassis may include a light guide member support portion supporting the light guide member, and a relaying and connecting part attaching portion having the hole. The relaying and connecting part may be attached to the relaying and connecting part attaching portion. The relaying and connecting part attaching portion may be disposed outside the light guide member support portion. In this way, because the relaying and connecting part attaching portion is provided outside the light guide member support portion in the bottom portion of the chassis, a sufficient space for installing the relaying and connecting part to be electrically connected to the light source in the chassis can be ensured.

(30) The lighting device may further include a pair of reflection members. The light source and the end portion of the light guide member disposed to face with each other to have a space therebetween, and the pair of reflection members may be disposed to sandwich the space. In this way, the light emitted from the light source is repeatedly reflected by the pair of reflection members within the space between the light source and the facing end portion of the light guide member. Therefore, the light can be incident on the end portion of the light guide member efficiently. Thus, the light use efficiency can be increased.

(31) The lighting device may further include an optical member. The chassis may include a bottom portion disposed on an opposite side to a light output side of the light source, and the optical member may be disposed on the light output side with respect to the bottom portion and the light source so as to face the bottom portion and the light source. In this way, the light emitted from the light source is irradiated onto the optical member disposed on the light output side with respect to the bottom portion and the light source so as to face the bottom portion and the light source, and is then output to the outside via the optical member.

(32) The chassis may include a side portion rising from an outer end of the bottom portion, and the hole may be formed in the side portion. In this way, the relaying and connecting part can be easily connected to the light source in the chassis by inserting the relaying and connecting part into the hole formed in the side portion from outside the chassis. Further, the thickness of the lighting device can be decreased in a preferred manner.

(33) The lighting device may further include an electric power supply unit disposed outside the chassis and configured to supply electric power to the light source via the relaying and connecting part. In this way, electric power can be supplied from the electric power supply unit to the light source via the relaying and connecting part.

(34) The lighting device may further include an electric power supply side connector disposed on the electric power supply unit, and a light source side connector connected to the light source and facing the hole in the chassis. The relaying and connecting part may include a flexible electric wire and a pair of connectors disposed at the ends of the electric wire. One of the connectors may be fitted and connected to the electric power supply side connector, and another one of the connectors may be fitted and connected to the light source side connector through the hole. In this way, one of the connector is fitted and connected to the electric power supply side connector, and another one of the connectors is fitted and connected to the light source side connector through the hole and thus electric power supply from the electric power supply unit to the light source can be relayed. Because the electric wire has flexibility, good workability can be obtained when inserting or removing the connector.

(35) The light source may be an LED. In this way, high brightness, low power consumption or the like can be achieved.

Next, to solve the above problem, a display device of the present invention includes the lighting device described above and a display panel providing a display by utilizing the light from the lighting device.

In the display device, the lighting device providing light to the display panel has excellent attaching or detaching workability and the entry of dust or the like is less likely to occur. Thus, manufacturing cost can be decreased and a display with high display quality can be realized.

The display panel may be a liquid crystal panel including a pair of substrates with liquid crystal enclosed therebetween. The display device as a liquid crystal display device may be applied to various purposes, including displays for televisions and personal computers, and is particularly suitable for large screens.

Advantageous Effect of the Invention

According to the present invention, workability can be improved and entry of dust or the like is less likely to occur.

BRIEF DESCRIPTION OF THE DRAWINGS

FIG. 1 is an exploded perspective view illustrating a schematic configuration of a television receiver according to the first embodiment of the present invention;

FIG. 4 shows a cross section taken along line iv-iv of FIG. 3, illustrating a cross sectional configuration of an LED board, a chassis, and the like;

BEST MODE FOR CARRYING OUT THE INVENTION

First Embodiment

A first embodiment of the present invention will be described with reference to FIGS. 1 to 7. According to the present embodiment, a liquid crystal display device 10 will be described by way of example. In some parts of the drawings, an X-axis, a Y-axis, and a Z-axis are shown as the respective axial directions corresponding to the directions shown in the respective drawings. The upper side and the lower side shown in FIGS. 3 and 4 correspond to the front side and the rear side, respectively.

As illustrated in FIG. 1, the television receiver TV according to the present embodiment includes the liquid crystal display device 10, front and back cabinets Ca and Cb between which the liquid crystal display device 10 is housed, a power source P, a tuner T, and a stand S. The liquid crystal display device (display device) 10 has a generally horizontally long (elongated) square (rectangular) shape, and is housed in a vertically disposed manner with a short side direction aligned with the vertical direction. The liquid crystal display device 10, as shown in FIG. 2, includes a liquid crystal panel 11 as a display panel and a backlight unit (lighting device) 12 as an external light source, which are integrally held by a frame-shaped bezel 13 or the like.

Figure 2:
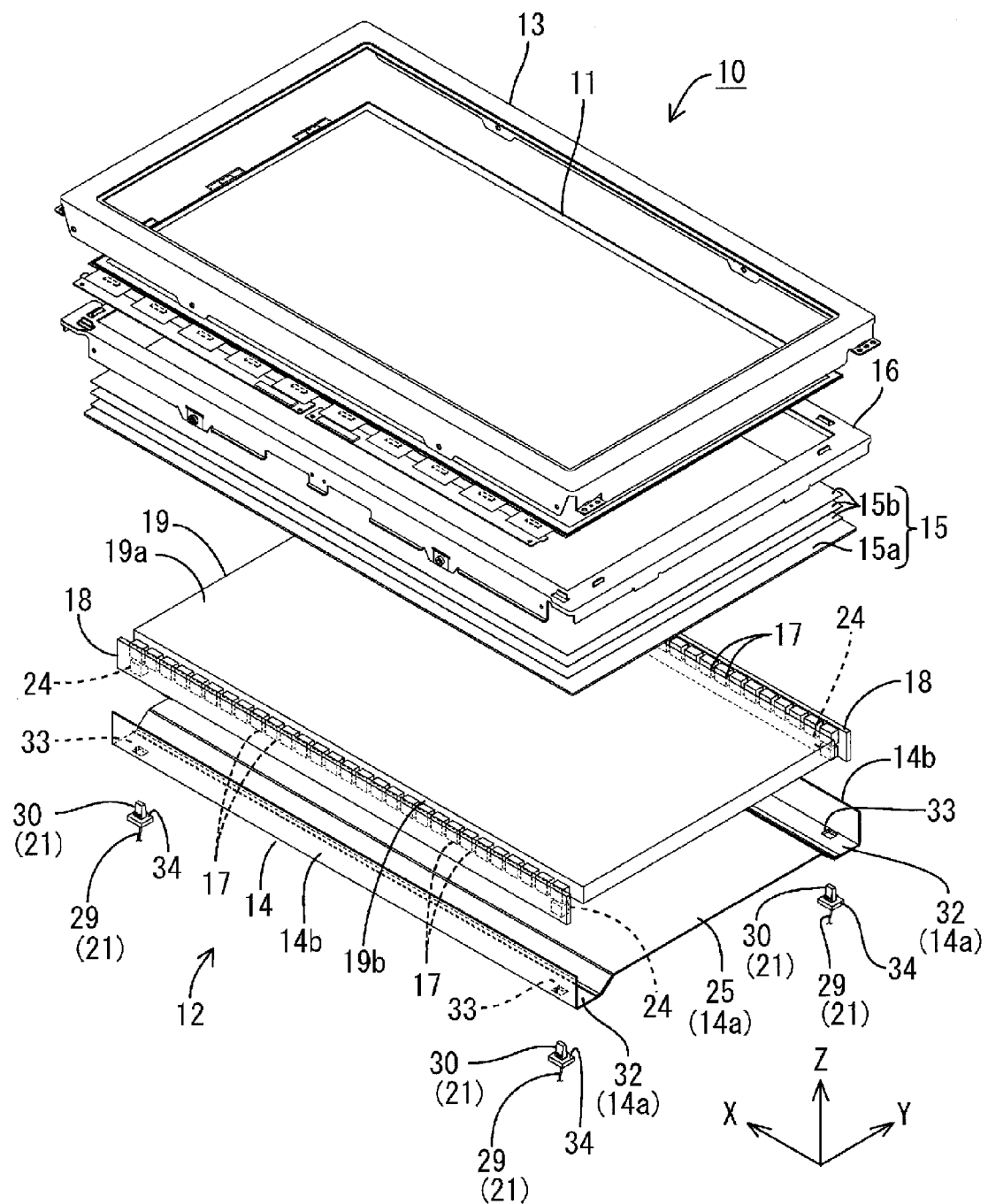
FIG. 2 is an exploded perspective view illustrating a schematic configuration of a liquid crystal display device included in the television receiver.

The liquid crystal panel 11, as shown in FIG. 2, has a horizontally long (elongated) square (rectangular) shape in plan view, including a pair of glass substrates affixed to each other via a predetermined gap, with liquid crystal enclosed between the glass substrates. One of the glass substrates has switching components (for example, TFTs) connected to a source wiring and a gate wiring orthogonal to each other, pixel electrodes connected to the switching components, an alignment film, or the like. The other glass substrate has a color filter including color sections of, for example, R (red), G (green), and B (blue) in predetermined arrangements, counter electrodes, an alignment film, or the like. On the outer sides of both glass substrates, polarizing plates are disposed.

The backlight unit 12, as shown in FIG. 2, includes a substantially box-shaped chassis 14 with an opening toward the front side (light output side; the side of the liquid crystal panel 11); and optical members 15 (a diffuser plate (light diffuser member) 15*a* and a plurality of optical sheets 15*b* disposed between the diffuser plate 15*a* and the liquid crystal panel 11) covering the opening of the chassis 14. Further, the chassis 14 houses LEDs (Light Emitting Diodes) 17 as light sources; LED boards 18 disposed in the chassis 14 and on which the LEDs 17 are mounted; a light guide member 19 guiding light from the LEDs 17 to the optical members 15 (liquid crystal panel 11); and a frame 16 retaining the light guide member 19 from the front side. The backlight unit 12 includes the LED boards 18 with the LEDs 17 along the long side ends of the backlight unit 12, and the light guide member 19 disposed at the center between the LED boards 18 on the sides. Thus, the backlight unit 12 is of the so-called edge light type (side light type). The backlight unit 12 further includes an electric power supply board 20 disposed outside the chassis 14 and configured to supply electric power to drive the LEDs 17 on the LED boards 18; and a relaying and connecting part 21 configured to relay the electric power from the electric power supply board 20 to the LEDs 17 on the LED boards 18. In the following, the constituent parts of the backlight unit 12 will be described in detail.

Figure 3:
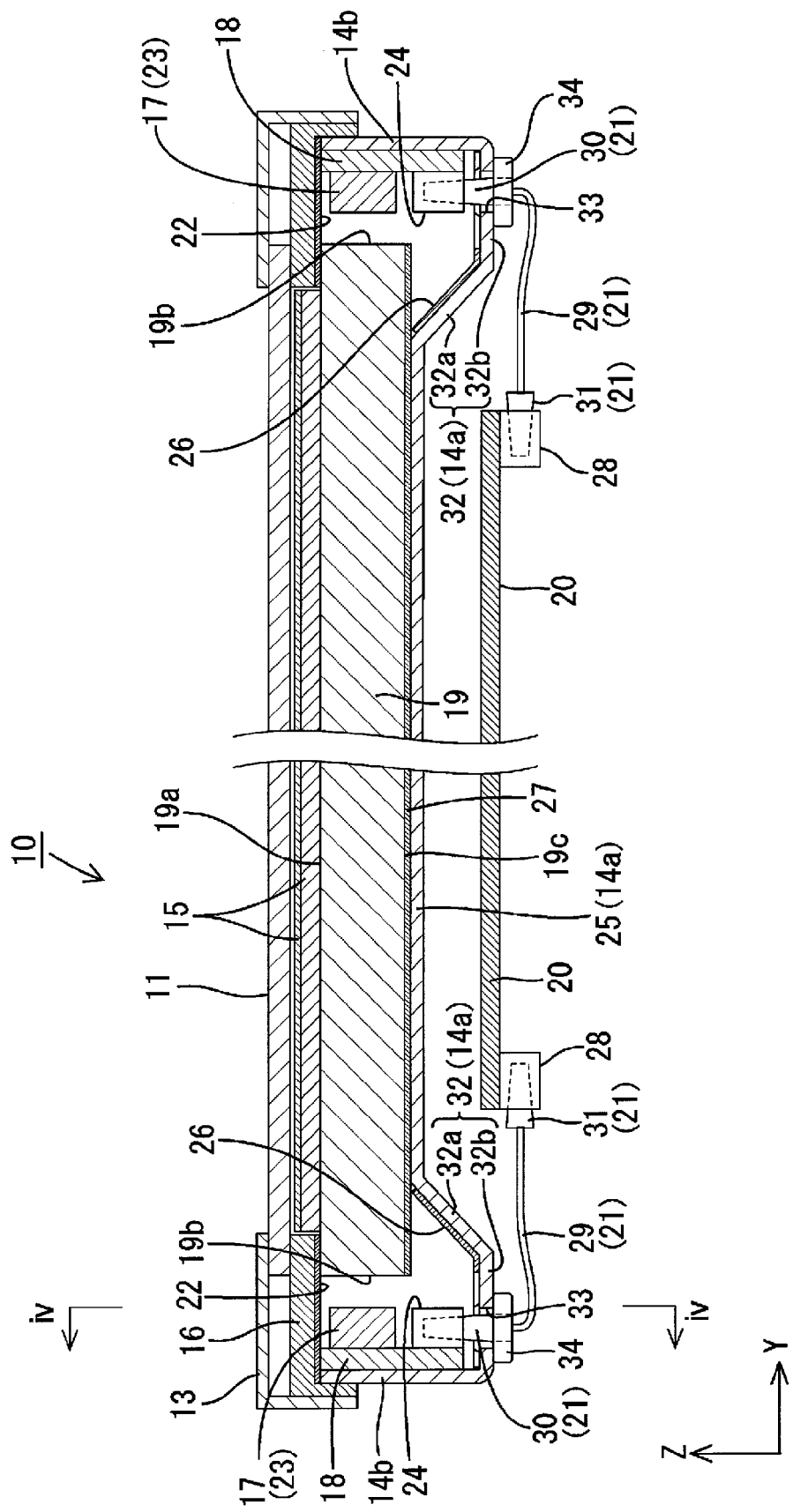
FIG. 3 is a cross sectional view illustrating a cross sectional configuration of the liquid crystal display device along a short side direction.

The chassis 14 is made of a metal and, as shown in FIGS. 2 and 3, includes a bottom plate 14*a* with a horizontally long square shape similar to the liquid crystal panel 11, and a pair of side plates 14*b* rising from the outer ends of the bottom plate 14*a* on the long sides thereof toward the front side (light output side). The chassis 14 (bottom plate 14*a*) has a long side direction aligned with the X-axis direction (horizontal direction) and a short side direction aligned with the Y-axis direction (vertical direction). A frame 16 and a bezel 13 are threadably attached to the side plates 14*b*. The details of the bottom plate 14*a*, such as its shape, will be described later.

The optical members 15, as shown in FIG. 2, have a horizontally long square shape in plan view, similar to the liquid crystal panel 11 and the chassis 14. The optical members 15 are mounted on the front side (light output side) of the light guide member 19 to be interposed between the liquid crystal panel 11 and the light guide member 19. The optical members 15 include the diffuser plate 15*a* disposed on the rear side (the side of the light guide member 19; opposite to the light output side), and the optical sheets 15*b* disposed on the front side (the side of the liquid crystal panel 11; light output side). The diffuser plate 15*a* includes a substantially transparent plate-like base substrate made of a resin with a predetermined thickness, in which a number of diffusing particles are dispersed. The diffuser plate 15*a* has the function of diffusing light transmitting therethrough. The optical sheets 15*b* are formed of a stack of three sheets, each with a thickness smaller than the one of the diffuser plate 15*a*. Specific types of the optical sheets 15*b* may include a diffuser sheet, a lens sheet, and a reflection type polarizing sheet, from which one or more may be appropriately selected and used.

The frame 16, as shown in FIG. 2, has a frame shape extending along the outer peripheral end portions of the light guide member 19 to retain substantially the entire outer peripheral ends portions of the light guide member 19 from the front side. The frame 16 is made of a synthetic resin and has a black surface, for example, thus providing light blocking property. To the rear side surfaces of the frame 16 on the long side portions, i.e., on the surfaces disposed in an opposed manner with respect to the light guide member 19 and the LED boards 18 (LEDs 17), as shown in FIG. 3, first reflection sheets 22 reflecting light are attached, respectively. The first reflection sheets 22 are dimensioned to extend over substantially the entire length of the long side portions of the frame 16. Thus, the first reflection sheets 22 are directly abutted on the end portions of the light guide member 19 on the side of the LEDs 17, and cover the end portions of the light guide member 19 and the LED boards 18 both from the front side. The frame 16 is also configured to receive the outer peripheral ends of the liquid crystal panel 11 from the rear side.

The LEDs 17 may include LED chips sealed on a board portion fixed on the LED boards 18 using a resin material, as illustrated in FIGS. 2 and 3. The LED chips mounted on the board portion have a single type of dominant light emission wavelength. Specifically, the LED chips emit a single color light of blue. The resin material sealing the LED chips contains a dispersion of phosphors that emit a predetermined color upon excitation by the blue light emitted by the LED chips such that substantially white light can be emitted as a whole. As the phosphor, a yellow phosphor that emits yellow light, a green phosphor that emits green light, and a red phosphor that emits red light may be used either individually or in an appropriate combination. The LEDs 17 have a light emitting surface on the side opposite to the side mounted on the LED boards 18, that is, the LEDs 17 are of the so-called "top type".

Figure 4:
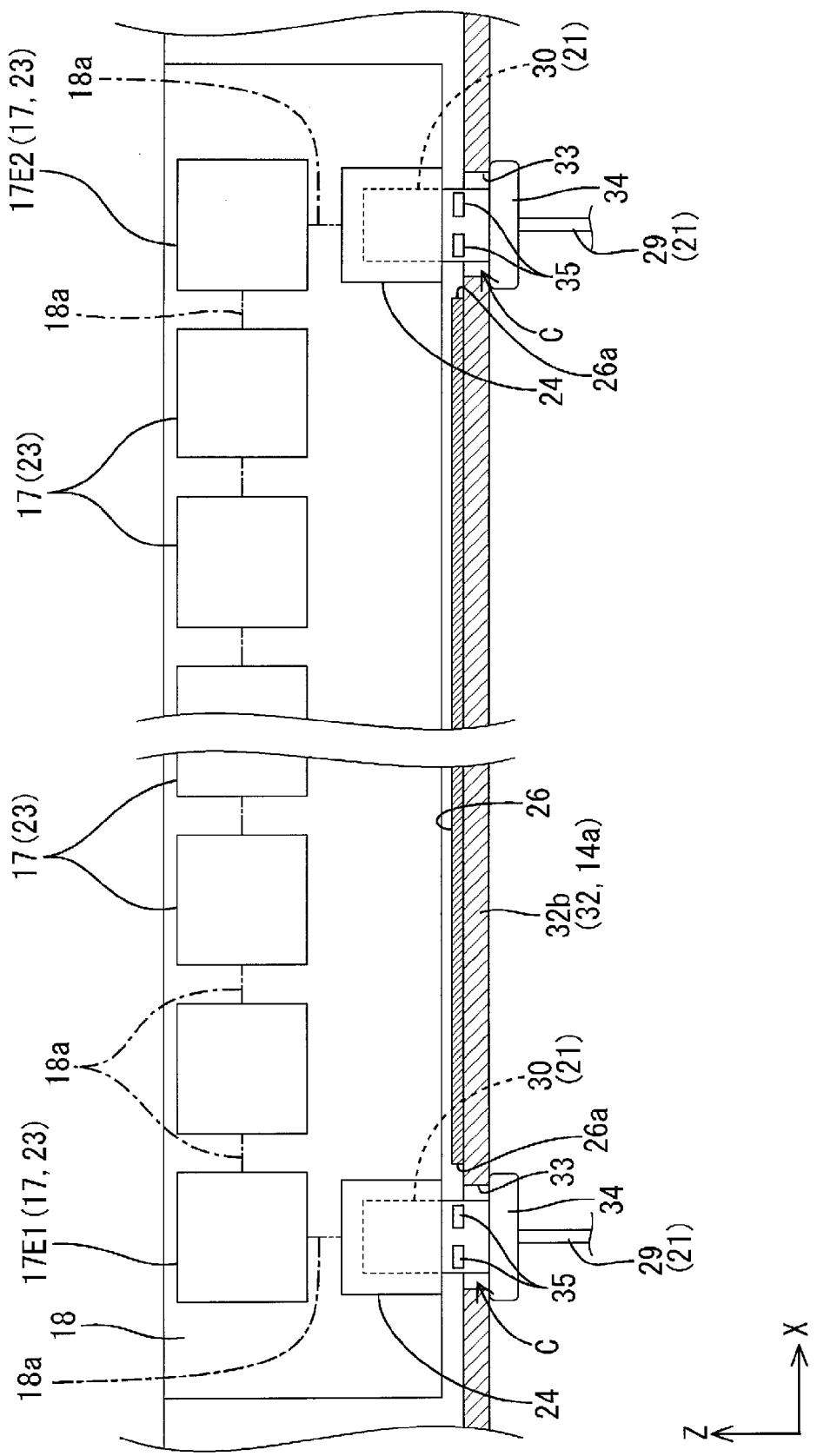

The LED boards 18, as shown in FIGS. 2 to 4, have an elongated plate shape extending along the long side direction of the chassis 14 (i.e., along the end portions of the light guide member 19 facing the LEDs 17). The LED boards 18 are housed in the chassis 14 with main plate surfaces parallel with the X-axis direction and the Z-axis direction; namely, orthogonal to the plate surfaces of the liquid crystal panel 11 and the light guide member (the optical members 15). Thus, the LED boards 18 are positioned with the long side direction and the short side direction of the main plate surfaces aligned with the X-axis direction and the Z-axis direction, respectively, and with a plate thickness direction orthogonal to the main plate surfaces aligned with the Y-axis direction. The LED boards 18, as shown in FIGS. 2 and 3, are disposed in a pair at positions sandwiching the light guide member 19 with respect to the Y-axis direction. Specifically, each one of the LED boards 18 is disposed between the light guide member 19 and each of the side plates 14*b* of the chassis 14, and housed in the chassis 14 from the front side along the Z-axis direction. The LED boards 18 according to the present embodiment are made of the same metal material as the chassis 14, such as an aluminum material. On a surface of the LED boards 18, a wiring pattern 18*a* is formed via an insulating layer.

An inner one of the main plate surfaces of the LED boards 18 that faces the light guide member 19 (i.e., the surface facing the end portions of the light guide member 19) constitutes amount surface 18*b* on which the LEDs 17 of the above configuration are surface-mounted. The other one of the main plate surfaces of the LED boards 18 on the opposite side to the light guide member 19, i.e., the surface on the opposite side to the mount surface 18*b* for the LEDs 17, is abutted on the inner surface of the side plates 14*b* of the chassis 14 and held in an attached state with respect to the side plates 14*b* via screws or the like. The pair of the LED boards 18 is housed in the chassis 14 with their mount surfaces 18*b* for the LEDs 17 in an opposed manner. Therefore, the light emitting surfaces of the LEDs 17 mounted on the LED boards 18 are opposed to each other, and the optical axes of the LEDs 17 are substantially aligned with the Y-axis direction. In other words, the LEDs 17 mounted on the pair of the LED boards 18 are disposed in an opposed manner with respect to the both end portions of the light guide member 19.

Figure 6:
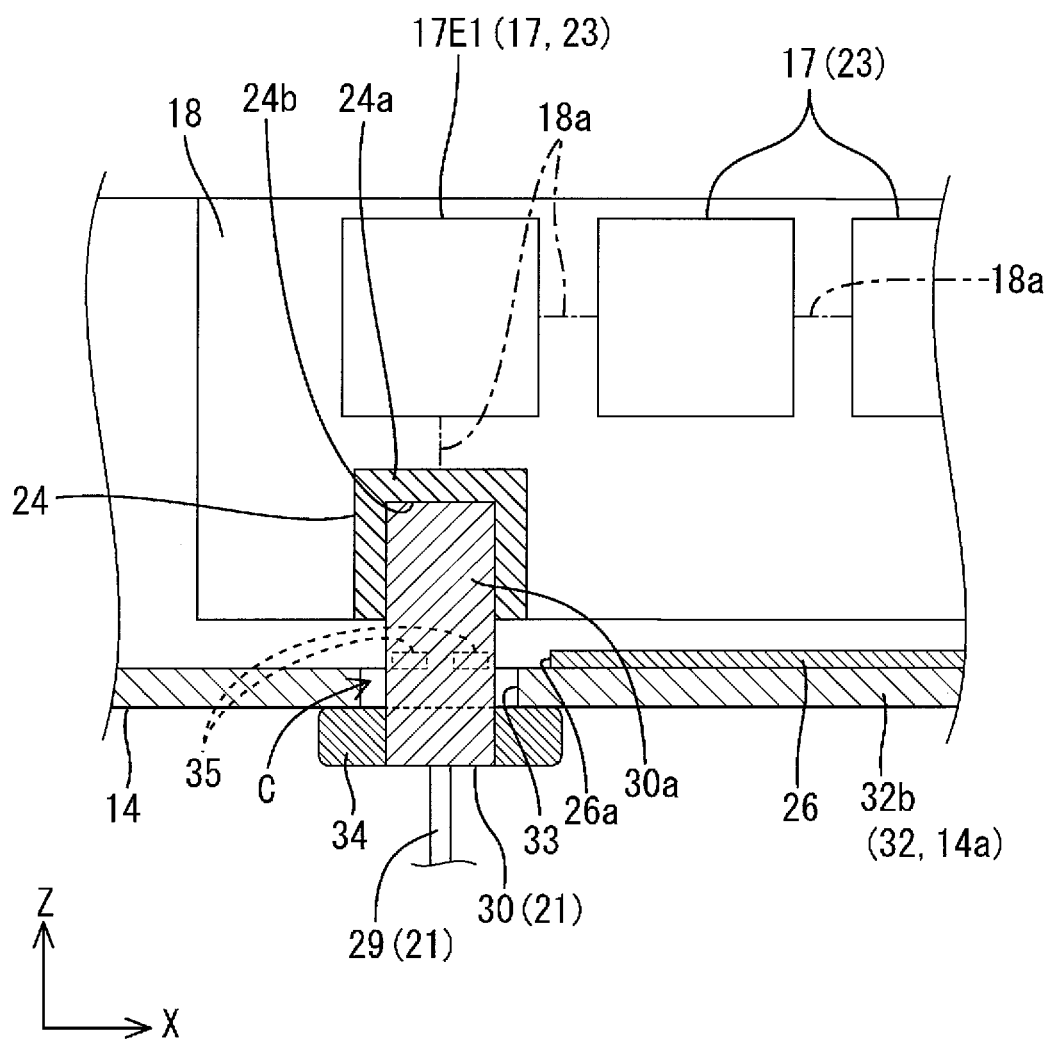
FIG. 6 shows a cross section taken along line vi-vi of FIG. 5, illustrating the details of the connection structure connecting the LED board and the electric power supply board by the relaying and connecting part.

As shown in FIGS. 2 and 4, a plurality of the LEDs 17 (29 in FIG. 2) is disposed in a line on the mount surface 18b of the LED boards 18 along the long side direction thereof (X-axis direction). The LEDs 17 that are disposed in a line constitute an LED group 23. The LED group 23 is disposed closer to the front-side end portion of the LED boards 18 with respect to the short side direction thereof (i.e., closer to the end opposite to light source side connectors 24, which will be described later); namely, the LED group 23 is disposed closer to the end portion of the LED boards 18 on the side of the frame 16 (on the side of the liquid crystal panel 11; the light output side). On the LED boards 18, as shown in FIG. 4, a wiring pattern 18a of a metal film (such as copper foil) is formed, connecting the adjacent LEDs 17 in series across the mounted LED group 23. Specifically, the wiring pattern 18a electrically connects all of the mounted LEDs 17 with each other linearly across the LEDs 17 between an LED 17E1 positioned at one end of the LED boards 18 in the long side direction and an LED 17E2 positioned on the other end. On the end portions of the LED boards 18 in the long side direction, the light source side connectors 24 are disposed as a pair, each connectable to the relaying and connecting part 21. Next, the light source side connectors 24 will be described in detail. In the following, in specifying one of the LEDs 17, the LED positioned at the left end of FIG. 4 will be designated with a suffix "E1", and the LED at the right end of FIG. 4 will be designated with a suffix "E2". If any one of the LEDs 17 is not specified and the LEDs 17 are generally referred to, no suffix will be added. In FIGS. 4 and 6, the wiring pattern 18a is indicated by the dot and dash line.

The light source side connectors 24, as shown in FIGS. 3 and 4, are surface-mounted on the mount surface 18b for the LEDs 17, of the LED boards 18. Thus, the LED boards 18 according to the present embodiment are of the single-surface mount type with only one of the main plate surfaces constituting the mount surface 18b. Of the pair of the light source side connectors 24 respectively disposed at both end portions of the LED boards 18 in the long side direction, one is adapted for an input side while the other is adapted for an output side. The light source side connectors 24 are displaced (separately positioned) from the LEDs 17 with respect to the Z-axis direction, i.e., the short side direction of the LED boards 18. Specifically, the light source side connectors 24 are respectively disposed side by side, in the Z-axis direction, with the LEDs 17E1 and 17E2 respectively positioned at the ends of the LED boards 18 in the long side direction, with a predetermined interval. The light source side connectors 24 are electrically connected to the LEDs 17E1 and 17E2 positioned at both ends of the LED boards 18 in the long side direction by the wiring pattern 18a. Connecting portions of the wiring pattern 18a that connect the light source side connectors 24 and the LEDs 17E1 and 17E2 are aligned along the Z-axis direction, and have a length corresponding to the distance between the light source side connectors 24 and the LEDs 17E1 and 17E2. The light source side connectors 24 are disposed closer to a side end of the LED boards 18 with respect to the short side direction (the Z-axis direction) that is an opposite side to the LED 17 side. Specifically, the light source side connectors 24 are disposed at the side end portion of the LED boards 18 close to the bottom plate 14a of the chassis 14 (closer to the relaying and connecting part 21; opposite to the light output side).

Figure 5:
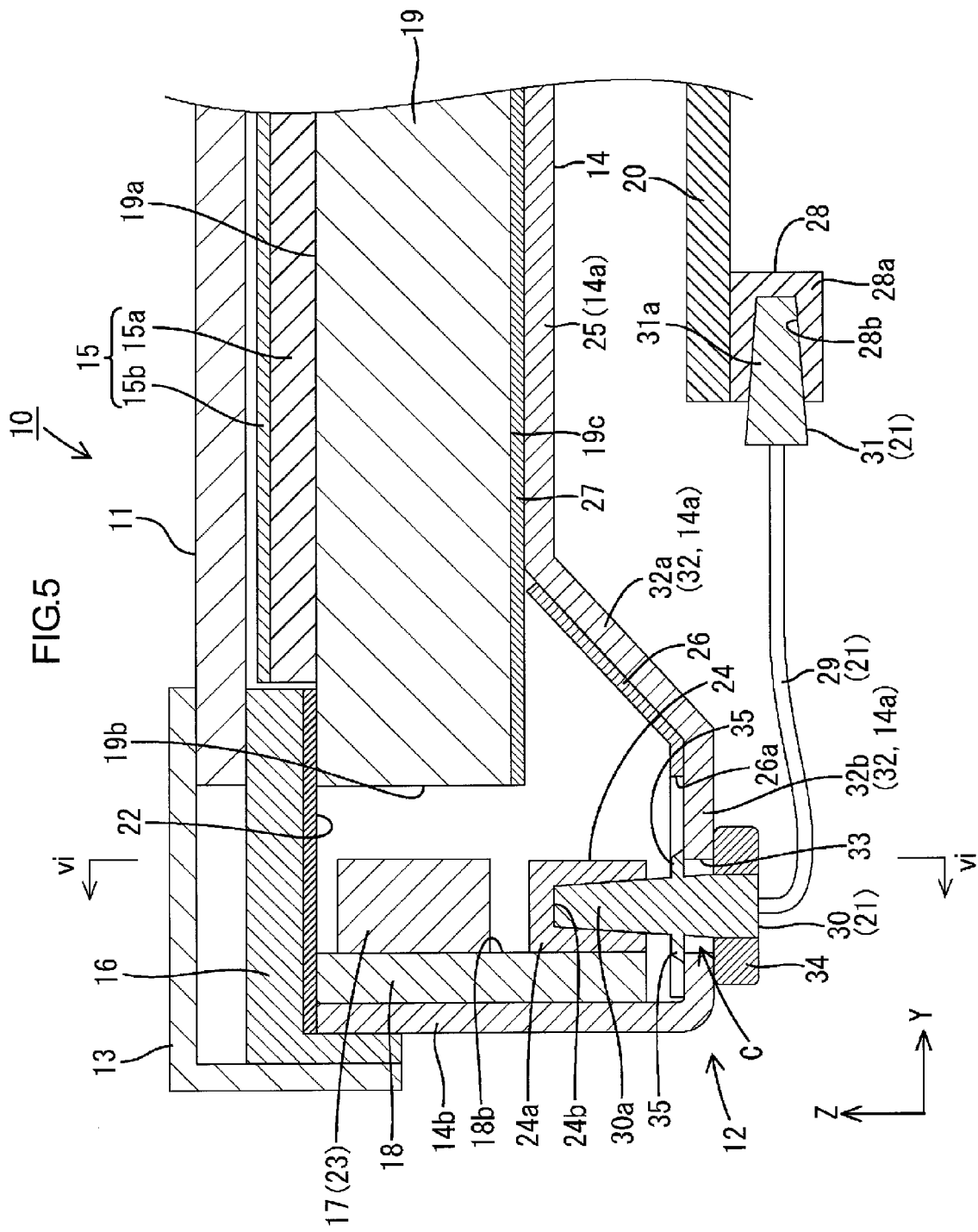
FIG. 5 is a cross sectional view illustrating the details of a connection structure connecting the LED board and an electric power supply board by a relaying and connecting part.

The light source side connectors 24, as shown in FIGS. 5 and 6, include a metal terminal portion (not shown) in conductive contact with the wiring pattern 18a, and a synthetic resin housing (insulating main body portion) 24a surrounding the terminal portion. The housing 24a as a whole is substantially block-shaped and includes an engaging recess 24b opened toward the rear side, i.e., toward the bottom plate 14a. The engaging recess 24b has a cross section of a tapered shape when taken along the Y-axis direction, i.e., the opening width gradually decreases from the opening end side toward the depth end side (FIG. 5). Into the engaging recess 24b, one end of the relaying and connecting part 21, which will be described in detail later, can be engaged in a mated manner. In other words, the light source side connectors are recessed (female type) to receive the relaying and connecting part 21.

The light guide member 19 is made of a substantially transparent (highly light transmissive) synthetic resin material (such as acrylic) with a refractive index higher than air. The light guide member 19, as shown in FIG. 2, has a plate shape of a horizontally long square in plan view, similar to the liquid crystal panel 11 and the chassis 14. The light guide member 19 has main surfaces with their long side direction and short side direction aligned with the X-axis direction and the Y-axis direction, respectively, and their thickness direction orthogonal to the main plate surfaces aligned with the Z-axis direction. The light guide member 19, as shown in FIG. 3, is disposed immediately under the liquid crystal panel 11 and the optical members 15 in the chassis 14 in a sandwiched manner with respect to the Y-axis direction between the pair of LED boards 18 respectively disposed at both ends of the chassis 14 on the long sides. Thus, the LEDs 17 (LED boards 18) and the light guide member 19 are arranged along the Y-axis direction, while the optical members 15 (liquid crystal panel 11) and the light guide member 19 are arranged along the Z-axis direction, the arrangement directions being orthogonal to each other. The light guide member 19 has a function of introducing the light emitted from the LEDs 17 along the Y-axis direction, and causing the light to be output upward toward the optical members 15 (Z-axis direction) while allowing the light to travel in the light guide member 19. The light guide member 19 is disposed at the central position of the bottom plate 14a of the chassis 14 in the short side direction. The central portion of the bottom plate 14a in the short side direction constitutes a light guide member support portion 25 supporting the light guide member 19 from the rear side. The light guide member 19 is slightly larger than the optical members 15 with the outer peripheral end portions extending outward beyond the outer peripheral end surfaces of the optical members 15 to be retained by the frame 16 (FIG. 3).

Of the main plate surfaces of the light guide member 19, as shown in FIG. 3, one on the front side constitutes a light output surface 19a causing the internal light to be output toward the optical members 15 and the liquid crystal panel 11. Of the outer peripheral end surfaces of the light guide member 19 adjacent to the main plate surfaces, the elongated end surfaces on the long sides respectively extend along the x-axis direction in an opposed manner with respect to the LEDs 17 (LED boards 18) with a predetermined interval therebetween. Namely, the elongated end surfaces constitute light incident surfaces 19b, on which the light from the LEDs 17 is incident. On the front side of the space between the LEDs 17 and the light incident surfaces 19b, the first reflection sheet 22 is disposed, as shown in FIG. 5. Further, on the rear side of the space, second reflection sheets 26 are disposed to sandwich the space with the first reflection sheet 22. The reflection sheets 22 and 26 also sandwich the end portions of the light guide member 19 facing the LEDs 17 and the LEDs 17 as well as the space, as shown in FIGS. 5 and 6. Thus, the light from the LEDs 17 can be repeatedly reflected between the reflection sheets 22 and 26 and thereby be incident on the light incident surfaces 19b efficiently. Moreover, the light incident surfaces 19b are parallel with the X-axis direction and the Z-axis direction (the main plate surfaces of the LED boards 18) and are substantially orthogonal to the light output surface 19a. The side plates 14b of the chassis 14, to which the LED boards 18 are attached, have plate surfaces substantially parallel with the light incident surfaces 19b. The LEDs 17 and the light incident surfaces 19b are arranged along the Y-axis direction to be parallel with the light output surface 19a.

A surface 19c of the light guide member 19 on the opposite side of the light output surface 19a is entirely covered with a light guide reflection sheet 27. The light guide reflection sheet 27 is configured to reflect the light in the light guide member 19 upward toward the front side. On at least one of the light output surface 19a and the surface 19c on the opposite side thereof in the light guide member 19, a reflecting portion (not shown) reflecting the internal light or a scattering portion (not shown) scattering the internal light is patterned with a predetermined in-plane distribution. Thus, output light from the light output surface 19a is controlled to have a uniform in-plane distribution.

The electric power supply board 20 includes a base member of a synthetic resin (such as epoxy resin), on which a predetermined wiring pattern (not shown) is formed and various electronic components (not shown) are mounted. The electric power supply board 20 is connected to the power source P of the liquid crystal display device 10. A pair of the electric power supply board 20, as shown in FIG. 3, is disposed in an opposed manner with respect to the rear outer side of the bottom plate 14a of the chassis 14. Specifically, the pair of the electric power supply boards 20 is disposed substantially symmetrically at the ends of the bottom plate 14a in the long side direction. The electric power supply boards 20 are disposed with their plate surfaces parallel with the plate surfaces of the bottom plate 14a. The electric power supply boards 20 have a horizontally long square shape in plan view, with their long side direction and short side direction aligned with the short side direction (the Y-axis direction) and the long side direction (the X-axis direction), respectively, of the bottom plate 14a. On the end portions of the electric power supply boards 20 closer to the ends of the bottom plate 14a in the short side direction, i.e., closer to the light source side connectors 24 of the LED boards 18, a pair of electric power supply side connectors 28 connectable to the relaying and connecting part 21 is provided. In the following, the electric power supply side connectors 28 will be described in detail.

The electric power supply side connectors 28, as shown in FIG. 3, are surface-mounted on the rear side of the electric power supply boards 20 opposite to the side facing the bottom plate 14. Of the pair of the electric power supply side connectors 28 disposed on the end portions of the electric power supply boards 20 in the long side direction thereof (the X-axis direction), one is adapted for the input side while the other is adapted for the output side. The electric power supply side connectors 28, as shown in FIGS. 5 and 6, include a metal terminal portion (not shown) in conductive contact with a wiring pattern formed on the electric power supply boards 20, and a synthetic resin housing (insulating main body portion) 28a surrounding the terminal portion. The housing 28a as a whole is substantially block-shaped and includes an engaging recess 28b which opens outward along the Y-axis direction, i.e., toward the light source side connectors 24 (LED boards 18). The engaging recess 28b has a cross section of a tapered shape when taken along the Y-axis direction, with the opening width gradually decreases from the opening end side toward the depth end side (FIG. 5). Into the engaging recess 28b, another end of the relaying and connecting part 21 opposite to the light source side connectors 24 can be engaged in a mated manner, as will be described in detail later. In other words, the electric power supply side connectors 28 are recessed (female type) to receive the relaying and connecting part 21.

Next, the relaying and connecting part 21, which electrically connects the electric power supply board 20 outside the chassis 14 with the LEDs 17 (LED group 23) on the LED boards 18 in the chassis 14 and relays the supply of electric power to the LEDs 17, will be described in detail. As shown in FIGS. 3 and 4, a total of four relaying and connecting parts 21 are disposed at the positions close to the ends of the bottom plate 14a of the chassis 14 in the short side direction (the Y-axis direction) and the long side direction (the X-axis direction), i.e., each one at the four corners of the bottom plate 14a of the chassis 14. Specifically, at the positions close to the ends of the bottom plate 14a of the chassis 14 in the short side direction and one end of the bottom plate 14a in the long side direction, a pair of the relaying and connecting parts 21 is disposed to mutually relay and connect the electric power supply side connectors 28 for the input side on the electric power supply boards 20 and the light source side connectors 24 for the input side on the LED boards 18. On the other hand, at the position close to the ends of the bottom plate 14a of the chassis 14 in the short side direction and the other end of the bottom plate 14a in the long side direction, another pair of the relaying and connecting parts 21 is provided to mutually relay and connect the electric power supply side connectors 28 for the output side on the electric power supply boards 20 and the light source side connectors 24 for the output side on the LED boards 18.

The relaying and connecting parts 21, as shown in FIG. 5, respectively include a flexible electric wire portion 29 and a pair of connector portions 30 and 31 disposed at the ends of the electric wire portion 29. One of the pair of the connector portions 30 and 31 is a first connector portion 30 to be engagingly connected to the light source side connectors 24 mounted on the LED boards 18 and housed within the chassis 14. The other is a second connector portion 31 configured to be engagingly connected to the electric power supply side connectors 28 mounted on the electric power supply boards 20 and disposed outside the chassis 14. The pair of the connector portions 30 and 31 has a common structure described below. Namely, the pair of the connector portions 30 and 31 respectively includes a metal terminal portion (not shown) in conductive connection with the end of the electric wire portion 29, and a synthetic resin housing 30a or 31a surrounding the terminal portion. The housings 30a and 31a are substantially block-shaped as a whole, with each front end configured to be engaged in the engaging recess 24b or 28b of the corresponding connector 24 or 28. In other words, the housings 30a and 31a of the pair of the connector portions 30 and 31 are convex (male type) to be engaged in the recessed connectors 24 and 28 in a mated manner. The engaging portion of the housings 30a and 31a, at least on the front end, becomes smaller in the cross section taken along the Y-axis direction, such that the outer surface thereof tapers in conformity with the inner surface of the engaging recesses 24b and 28b. The terminal portion of the first connector portion 30 is configured to conductively contact with the terminal portion of the light source side connectors 24 upon engagement. Similarly, the terminal portion of the second connector portion 31 is configured to conductively contact with the terminal portion of the electric power supply side connectors 28 upon engagement.

Next, the first connector portion 30 of the relaying and connecting parts 21 that is engaged in the light source side connectors 24 disposed within the chassis 14 will be described in detail. As shown in FIGS. 2 and 3, the end portions of the bottom plate 14a of the chassis 14 in the short side direction (the Y-axis direction), i.e., portions except for the light guide member support portion 25 of bottom plate 14a of the chassis 14, constitute relaying and connecting part attaching portions 32 to which the first connector portion 30 can be attached from outside the chassis 14. The relaying and connecting part attaching portions 32 include inclined rising portions 32a rising from the light guide member support portion 25 toward the rear side, and outer end portions 32b outwardly extending from the rising end of the rising portions 32a along the Y-axis direction. The outer end portions 32b are parallel with the light guide member support portion 25. The side plates 14b rise from the outer ends of the outer end portions 32b. The outer end portions 32b include hole portions 33 into which the first connector portion 30 can be inserted from outside the chassis 14.

As shown in FIGS. 2 and 4, a pair of the hole portions 33 is formed close to the ends in the outer end portions 32b of the relaying and connecting part attaching portions 32 in the X-axis direction. The hole portions 33, as shown in FIGS. 3 and 4, are disposed at positions overlapping with the light source side connectors 24 mounted on the LED boards 18 in plan view. Thus, the engaging recess 24b of the light source side connectors 24 is disposed facing the hole portions 33. In other words, the hole portions 33 are disposed to be communicated and aligned with the engaging recess 24b of the light source side connectors 24. Accordingly, as the first connector portion 30 is inserted into the hole portions 33 from outside the bottom plate 14a on the rear side, the front end portion of the first connector portion 30 is advanced into the chassis 14 via the hole portions 33 and engaged in the engaging recess 24b of the light source side connectors 24 in a mated manner. Thus, the hole portions 33 function as a positioning structure for the first connector portion 30 with respect to the engaging recess 24b of the light source side connectors 24, as well as receiving the first connector portion 30 into and from outside the chassis 14. When inserted into the hole portions 33, the first connector portion 30, as shown in FIG. 5, penetrates the bottom plate 14a of the chassis 14, and the portion inserted into the chassis 14 and the light source side connectors 24 engaged therein is located lower than the light guide member 19, i.e., displaced from the light guide member 19 with respect to the Z-axis direction (orthogonal to the plate surfaces of the electric power supply board 20; the direction along which the LED boards 18 may be inserted or removed). In this way, the light supplied from the LEDs 17 toward the light guide member 19 is not blocked by the first connector portion 30 and the light source side connectors 24. Further, the second reflection sheets 26 are disposed along the inner surfaces of the relaying and connecting part attaching portions 32 across the rising portions 32a and the outer end portions 32b. The second reflection sheets 26, however, include cut-outs 26a in the area overlapping with the light source side connectors 24 and the first connector portion 30 (hole portions 33) in plan view (FIGS. 5 and 6).

The hole portion 33, as shown in FIGS. 5 and 6, has an opening area slightly larger than the outer size of the first connector portion 30 in view of the assembly tolerance of the LED boards 18 with respect to the chassis 14, and the workability in attaching the first connector portion 30 to the chassis 14 (insertion operability with respect to the hole portions 33). Thus, when the first connector portion 30 is inserted into the hole portion 33, a predetermined clearance C is provided between the first connector portion 30 and the hole portion 33 in a direction orthogonal to the Z-axis direction (i.e., the X-axis direction and the Y-axis direction). The size (opening area) of the hole portion 33 is determined in consideration of the difference in coefficient of thermal expansion between the chassis 14 and the LED boards 18; specifically, the size is determined such that the communication between the engaging recess 24b of the light source side connector 24 and the hole portion 33 can be reliably maintained even when the LED boards 18 are displaced relative to the chassis 14 by thermal expansion or thermal contraction. However, the presence of the clearance C between the first connector portion 30 and the hole portion 33 may permit the entry of external dust or the like into the chassis 14. If dust enters the chassis 14, the dust may attach to the LEDs 17 or the light guide member 19, which may prevent the backlight unit 12 from providing its full optical performance.

Thus, according to the present invention, the first connector portion 30, as shown in FIGS. 5 and 6, is integrally provided with a covering member 34 that covers the clearance between the first connector portion 30 and the hole portion 33, whereby the dust or the like outside the chassis 14 can be prevented from entering the chassis 14 via the clearance C between the first connector portion 30 and the hole portion 33. The covering member 34, while being a separate component from the housing 30a of the first connector portion 30, is integrally fitted on the outer surfaces of the first connector portion 30. The covering member 34 is made of an elastically deformable material, such as a rubber material, such that the covering member 34 has sufficiently high contact property with respect to the outer surfaces of the first connector portion 30 and the hole edge of the hole portion 33. In addition, the covering member 34 has sufficient light blocking property to prevent the light within the chassis 14 from leaking outside via the clearance C. The covering member 34 has a ring shape surrounding the first connector portion 30, with an inner diameter slightly smaller than the outer diameter of the first connector portion 30. Thus, the covering member 34, when fitted on the outer circumferential surface of the first connector portion 30, is elastically deformed such that the opposed circumferential surfaces of the first connector portion 30 and the covering member 34 can be maintained in a closely contacted state along the entire circumference with almost no gap.

The covering member 34 is disposed on a rear-end portion of the first connector portion 30 in the direction of engagement with the light source side connector 24, i.e., on the end portion opposite to the portion engaged with the light source side connector 24. The rear-end portion of the first connector portion 30, on which the covering member 34 is mounted, is the portion that is disposed outside the chassis 14 when the first connector portion 30 is inserted in the hole portion 33. Thus, the covering member 34 is disposed outside the chassis 14. Because the outer diameter of the covering member 34 is larger than the diameter of the hole portion 33, the surface of the covering member 34 facing the front side is abutted on the outer surface of the hole edge of the hole portion 33 formed in the outer end portion 32b of the bottom plate 14a of the chassis 14 in a surface-to-surface contact manner. Because the covering member 34 has the ring shape as described above and surrounds the hole portion 33 along their entire circumference, the covering member 34 is abutted on the hole edge of the hole portion 33 along the entire circumference thereof. Thus, the entry of dust or the like or the leakage of internal light via the clearance between the hole portion 33 and the first connector portion 30 can be reliably prevented.

Further, the first connector portion 30, as shown in FIG. 5, includes holding portions 35 configured to hold the first connector portion 30 onto the chassis 14 by being locked on the hole edge of the hole portion 33 of the chassis 14. The holding portions 35 are disposed between the engaged portion of the housing 30a of the first connector portion 30 in the light source side connector 24 and the portion on which the covering member 34 is mounted. Specifically, the housing 30a includes the holding portions 35, in the direction of engagement, at the rear end of the portion located in the chassis 14. More specifically, a pair of the holding portions 35 is provided on the outer surface of the housing 30a along the X-axis direction. The holding portions 35 are formed as planar pieces outwardly protruding from the surface along the Y-axis direction. The holding portions 35 are elastically deformable. The protruding ends thereof have a tapered surface to allow the holding portions 35 to be easily bent by the hole edge of the hole portion 33 at the time of insertion. The holding portions 35 protrude from the outer surface of the housing 30a by a length greater than the clearance C provided between the first connector portion 30 and the hole portion 33. Therefore, the holding portions 35 can be reliably locked on the inner surface at the hole edge of the hole portion 33. Thus, the hole edge of the hole portion 33 is sandwiched between the holding portions 35 inside the chassis 14 and the covering member 34 outside the chassis 14. The holding portions 35 and the covering member 34 are spaced apart from each other in an opposed manner with a predetermined interval in the Z-axis direction. The interval is set to be slightly smaller than the thickness of the hole edge of the hole portion 33 (i.e., the thickness of the bottom plate 14a of the chassis 14). In this way, when the holding portions 35 are locked on the inner surface of the hole edge of the hole portion 33 (the inner surface of the bottom plate 14a), the covering member 34 contacts with an outer surface of the hole edge of the hole portion 33 (the outer surface of the bottom plate 14a) in a somewhat elastically contracted manner with respect to the Z-axis direction, thereby providing high contact property of the covering member 34 to the hole edges of the hole portions 33 with almost no gap.

An operation of the present embodiment with the above structure will be described below. When the liquid crystal display device 10 is manufactured, the liquid crystal panel 11, the backlight unit 12, the bezel 13, and the like are separately manufactured, and then assembled. In the following, a procedure for manufacturing the liquid crystal display device 10 will be described in detail.

Figure 7:
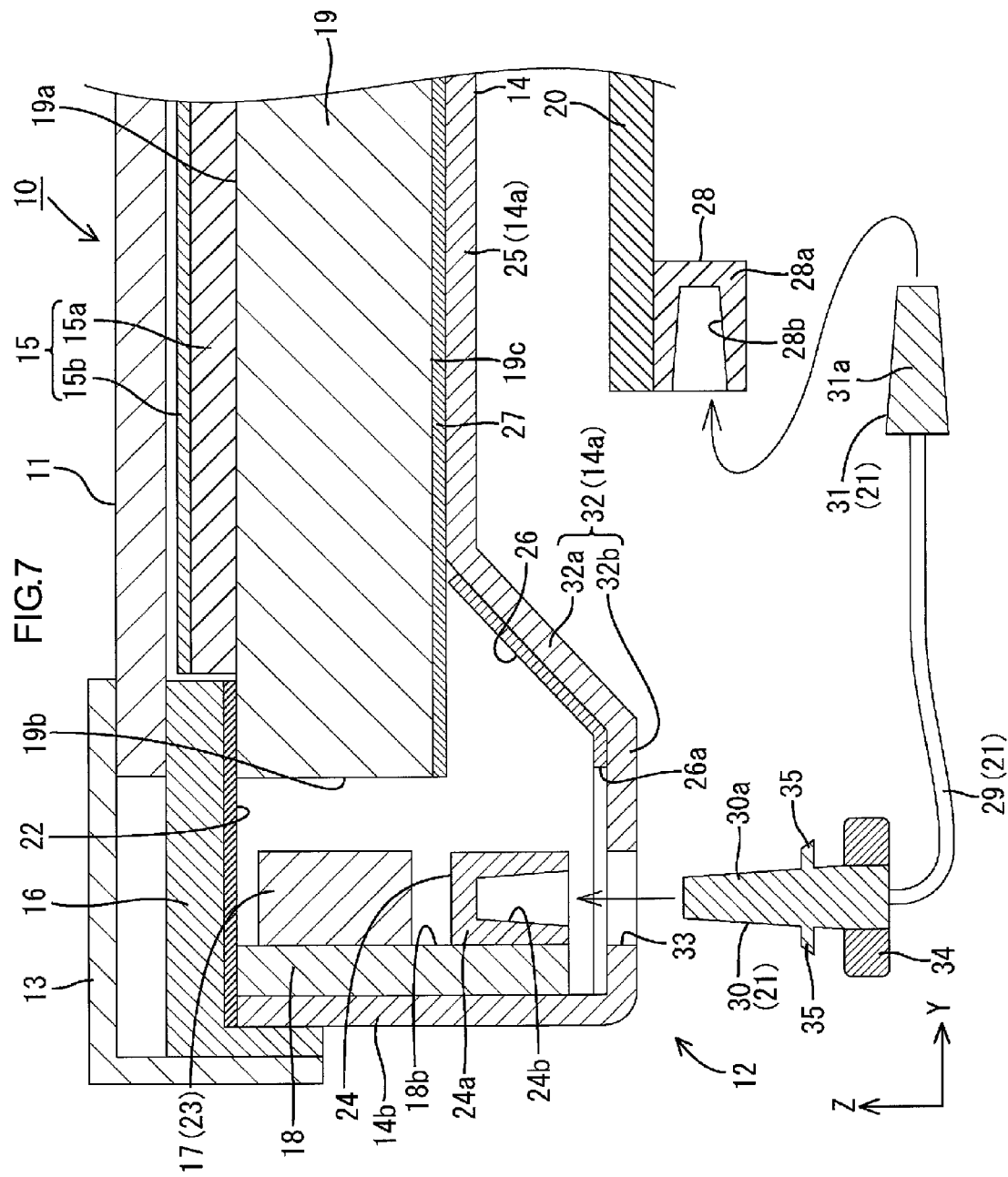
FIG. 7 is a cross sectional view illustrating a light source side connector on the LED board and an electric power supply side connector on the electric power supply board, prior to connecting the relaying and connecting part to the connectors.

First, in order to assemble the backlight unit 12, the LED boards 18, the second reflection sheets 26, and the light guide member 19 are attached within the chassis 14. The LED boards 18 are fixed in an attached state with screws or the like while fitting the surface opposite to the mount surface 18b for the LEDs 17 and the like onto the inner surface of the side plates 14b extending along the long side direction (the X-axis direction), as shown in FIG. 7. As a result, the light source side connectors 24 mounted on the LED boards 18 are positioned with their engaging recesses 24b substantially aligned and communicated with the hole portions 33 of the relaying and connecting part attaching portions 32 of the bottom plate 14a in an exposed manner to the outside of the chassis 14 on the rear side via the hole portions 33. The second reflection sheets 26 are laid along the relaying and connecting part attaching portions 32 of the bottom plate 14a, and the light source side connectors 24 are passed through the cut-outs 26a. The light guide member 19 is mounted on the light guide member support portion 25 of the bottom plate 14a (i.e., at the center of the bottom plate 14a in the short side direction), with the light guide reflection sheet 27 attached to the surface 19c on the rear side.

Thereafter, the frame 16 is assembled to retain the light guide member 19 from the front side, and the optical members 15 are mounted on the light guide member 19. Then, the liquid crystal panel 11 and the bezel 13 are assembled successively. On the other hand, on the rear side of the chassis 14, the electric power supply boards 20 are assembled. The electric power supply boards 20 are fixed in an attached state with respect to bosses located at some areas of the light guide member support portion of the bottom plate 14a, with screws or the like.

Next, an operation for assembling the relaying and connecting parts 21 will be described in detail. As shown in FIG. 7, the relaying and connecting part 21 is attached from outside the chassis 14 by engagingly connecting the first connector portion and the second connector portion 31 to the light source side connector 24 within the chassis 14 and the electric power supply side connector 28 outside the chassis 14, respectively. During the engaging operation, the electric wire portion 29 with sufficient flexibility provides excellent workability. As the first connector portion 30 is inserted into the hole portion 33 of the relaying and connecting part attaching portion 32 of the bottom plate 14a from the outer rear side, the front end portion of the first connector portion 30 advances into the chassis 14 and is engaged in the engaging recess 24b of the light source side connector 24 facing the hole portion 33. In this process, the holding portions 35 are guided along the their tapered surfaces and temporarily elastically deformed as they pass through the hole portion 33. When the first connector portion 30 has been pushed into the chassis 14 to a predetermined depth, the holding portions 35 are entirely inserted within the chassis 14, and elastically return into their original shape to be locked on the inner surface at the hole edges of the hole portion 33, as shown in FIG. 5. Thus, the first connector portion 30 is held in an attached state with respect to the chassis 14 through the bottom plate 14a. At this time, the covering member 34 of the rubber material is closely attached onto the outer surface of the hole edges of the hole portion 33 with its front side surface in a slightly elastically contracted state. As a result, the hole edge of the hole portion 33 is sandwiched between the holding portions 35 in the chassis 14 and the covering member 35 outside the chassis 14. Because the covering member 34 surrounds the first connector portion 30 and the hole portion 33 along the entire circumference thereof, the clearance C provided between the first connector portion 30 and the hole portion 33 can be entirely and reliably covered. Thus, the dust or the like which may exist outside the chassis 14 can be reliably prevented from entering the chassis 14 through the hole portion 33. Accordingly, the attachment of foreign matter, such as dust or the like, onto the optical components disposed in the chassis 14, such as the LEDs 17 and the light guide member 19, can be prevented. Therefore, the backlight unit 12 can fully provide its optical performance, and the liquid crystal display device 10 with excellent display quality can be obtained.

On the other hand, the second connector portion 31 is engaged in the engaging recess 28b of the electric power supply side connector 28 on the electric power supply board 20 outside the chassis 14. Thereby, the electric power supply board 20 and the LED group 23 (LEDs 17) on the LED board 18 are mutually electrically connected to each other. When the light source side connectors 24 and the corresponding electric power supply side connectors 28 are mutually engagingly connected on each of the input and the output sides via the corresponding relaying and connecting parts 21, all of the LEDs 17 in the LED group 23 on the LED board 18 can be supplied with electric power.

Conventionally, the connectors are connected to the LED boards within the chassis, and the electric wires connected to connectors are required to be run in and out of the chassis, causing the problem of poor assembly workability. In addition, for detaching the connectors disposed in the chassis from the LED boards for repair or inspection (maintenance) purposes, major portions of the liquid crystal display device, such as the liquid crystal panel and the optical members, are likely to require disassembling, resulting in unfavorable detaching workability. In this respect, according to the present invention, electrical connection to the LED boards 18 can be established by simply inserting the first connector portion 30 into the hole portion 33 from outside the chassis 14 in a single-action operation. Therefore, extremely high attaching workability can be obtained. Further, for repair or inspection (maintenance), the first connector portion 30 penetrating the chassis 14 in the attached state can be unplugged from the chassis 14 by directly manipulating the portion of the first connector portion 30 that protrudes outside the chassis 14 (covering member 34), and thereby the detaching operation is accomplished by a single-action. Thus, the detaching operation can be performed by manipulating only the first connector portion 30 without removing other members, providing extremely high detaching workability.

When the power source for the liquid crystal display device 10 manufactured as described above is turned on, the driving of the liquid crystal panel 11 is controlled by a control circuit which is not shown, while drive electric power is supplied from the electric power supply boards 20 to the LEDs 17 on the LED boards 18 via the relaying and connecting parts 21 to control the driving of the LEDs 17. The light from the LEDs 17, as shown in FIG. 3, is guided by the light guide member 19 to be irradiated onto the liquid crystal panel 11, and thereby a predetermined image is displayed on the liquid crystal panel 11. In the following, an operation of the backlight unit 12 will be described in detail. As the LEDs 17 are turned on, the light emitted from the LEDs 17 is incident on the light incident surfaces 19b of the light guide member 19, as shown in FIG. 5. Although the predetermined space is provided between the LEDs 17 and the light incident surfaces 19b, the space is optically closed and blocked by the first reflection sheet 22 on the front side and the second reflection sheets 26 on the rear side. Thus, the light from the LEDs 17 is repeatedly reflected by the reflection sheets 22 and 26 such that the light can be incident on the light incident surfaces 19b efficiently with hardly any of the light leaking outside.

As described above, the backlight unit 12 according to the present embodiment includes the chassis 14 with the hole portions 33; the LEDs 17 housed in the chassis 14 as light sources; the relaying and connecting parts 21 configured to be electrically connected to the LEDs 17 by being inserted into the hole portions 33 from outside the chassis 14 and configured to relay electric power supply to the LEDs 17; and the covering member 34 covering the clearance between the hole portions 33 and the relaying and connecting parts 21 inserted therein.

In this way, as the relaying and connecting parts 21 are inserted into the hole portions 33 of the chassis 14 from outside the chassis 14, the relaying and connecting parts 21 are electrically connected to the LEDs 17 in the chassis 14 to relay electric power supply to the LEDs 17, while the clearance between the hole portions 33 and the relaying and connecting parts 21 can be covered by the covering member 34.

When connectors with electric wires provided at the ends thereof are used for the electrical connection and electric power supply to the LEDs, as is conventionally done, it is necessary to perform connecting operation of the connectors to the LEDs within the chassis and run the electric wires in and out of the chassis through the hole portions formed in the chassis, which results in unfavorable attaching workability. In addition, when it is necessary to disconnect the connectors disposed within the chassis from the LEDs for repair or the like, it is likely that major portions of the backlight unit need to be disassembled, which adversely affects the detaching workability as well. Furthermore, conventionally, the hole portions of the chassis are dimensioned to provide a sufficient clearance from the electric wires to permit assembly tolerance for the constituent parts of the backlight unit or ensure workability in passing the electric wires, for example. Such clearance may permit the entry of dust or the like from outside the chassis, which may adversely affect the optical performance of the backlight unit, for example.

In this respect, according to the present embodiment, electrical connection and electric power supply to the LEDs 17 in the chassis 14 can be established by inserting the relaying and connecting parts 21 into the hole portions 33 of the chassis 14, providing high attaching workability. In addition, the electrical connection of the relaying and connecting parts 21 to the LEDs 17 can be removed for repair or the like by detaching the relaying and connecting parts 21 from the chassis 14 through the hole portions 33. Therefore, high detaching workability can be obtained. While there is the clearance C between the hole portions 33 of the chassis 14 and the relaying and connecting parts 21 inserted therein to permit assembly tolerance and ensure insertion workability for the relaying and connecting parts 21, the clearance C can be covered by the covering member 34. Thus, the entry of dust or the like into the chassis 14 from the outside via the clearance between the hole portions 33 and the relaying and connecting parts 21 can be prevented.

The relaying and connecting part 21 includes the flexible electric wire portion 29 and the first connector portion 30 provided at one end of the electric wire portion 29. The first connector portion 30 is inserted into the hole portion 33. In this way, electrical connection to the LEDs 17 in the chassis 14 can be established by inserting the first connector portion 30 provided at the end of the electric wire portion 29 into the hole portion 33 of the chassis 14. Because the electric wire portion 29 is flexible, good workability can be obtained when inserting or removing the first connector portion 30 into or out of the hole portion 33, leading to excellent workability.

The covering member 34 is integrally provided to the first connector portion 30. In this way, the clearance between the hole portion 33 and the first connector portion 30 can be covered by the covering member 34 when the first connector portion 30 is inserted into the hole portion 33. Thus, better attaching workability can be obtained.

The covering member 34 has a ring shape surrounding the first connector portion 30 and is fitted on the first connector portion 30. In this way, the covering member 34 can be easily integrated with the first connector portion 30 by fitting the ring-shaped covering member 34 on the first connector portion 30.

The first connector portion 30 includes the holding portions 35 configured to hold the first connector portion 30 with respect to the chassis 14 by being locked on the hole edge of the hole portion 33. In this way, the first connector portion 30 can be stably held with respect to the chassis 14 by the holding portions 35.

The covering member 34 is abutted on the hole edge of the hole portion 33 from the opposite side to the holding portions 35 such that the hole edge of the hole portion 33 is sandwiched between the covering member 34 and the holding portions 35. In this way, because the hole edge of the hole portion 33 is sandwiched between the holding portions 35 and the covering member 34, high contact property of the covering member 34 with respect to the hole edge of the hole portion 33 can be maintained while the first connector portion 30 is stably held with respect to the chassis 14. Thus, the entry of dust or the like into the hole portions 33 can be prevented in a more preferred manner.

The covering member 34 is made of an elastic material. In this way, the covering member 34 can elastically contact with the hole portion 33 and the relaying and connecting part 21, leading to high contact property. Thus, the entry of dust or the like via the clearance between the hole portions 33 and the relaying and connecting parts 21 can be prevented in a more preferred manner.

The covering member 34 is made of a rubber material. In this way, higher contact property with respect to the hole portion 33 and the relaying and connecting part 21 can be obtained. Therefore, the entry of dust or the like can be prevented in a more preferred manner. Also, the manufacturing cost for the covering member 34 can be reduced.

The covering member 34 has a ring shape surrounding the hole portion 33. In this way, the hole portion 33 can be reliably covered along the entire circumference thereof by the covering member 34 with the ring shape surrounding the hole portions 33, more reliably preventing the entry of dust or the like.

The covering member 34 has light blocking property. In this way, the light within the chassis 14 can be prevented from leaking outside via the hole portions 33.

In the chassis 14, the light source side connectors 24 connected to the LEDs 17 and disposed facing the hole portions 33 are provided such that the relaying and connecting parts 21 inserted through the hole portions 33 and engagingly connected to the light source side connectors 24. In this way, as the relaying and connecting parts 21 are inserted into the hole portions 33, the relaying and connecting parts 21 are engagingly connected to the light source side connectors 24 disposed facing the hole portions 33 in the chassis 14. Thus, better workability can be obtained.

The light source side connectors 24 are recessed to receive the portion (first connector portion 30) of the relaying and connecting parts 21 that is connected to the light source side connectors 24. In this way, because the light source side connectors 24 disposed in the chassis 14 are recessed, compared with a case where the light source side connectors 24 are convex, the space for installing the light source side connectors 24 in the chassis 14 can be decreased. Thus, the size of the backlight unit 12 can be decreased in a preferred manner.

The backlight device 12 includes the LED boards 18 on which the LEDs 17 are mounted, and the light source side connectors 24 are mounted on the LED boards 18. In this way, the LEDs 17 mounted on the LED boards 18 and the light source side connectors 24 can be disposed at their predetermined positions by disposing the LED boards 18 within the chassis 14. Thus, excellent workability can be obtained.

The LEDs 17 and the light source side connectors 24 are mounted on the common surface of the LED boards 18. In this way, the LED boards 18 of the single-side mount type can be used, reducing in the manufacturing cost for the LED boards 18.

The LED boards 18 have an elongated shape with a plurality of the LEDs 17 disposed side by side in a line along the long side direction thereof. The light source side connectors 24 are disposed at the end portions of the LED boards 18 in the long side direction. In this way, compared with a case where the light source side connectors are disposed at the center of the LED boards 18 in the long side direction, the light source side connectors 24 are not easily visually recognized as dark areas. Thus, uneven brightness can be prevented in a preferred manner.

The backlight device 12 also includes the light guide member 19 with the end portions facing the LEDs 17. In this way, the light emitted from the LEDs 17 is incident on the opposingly disposed end portions of the light guide member 19 first, and then guided toward the light output side to output therefrom.

There is also provided the LED boards 18 on which the LEDs 17 are mounted. The LED boards 18 include the mount surface 18b for the LEDs 17 to face the end portions of the light guide member 19. In this way, by disposing the LED boards 18 with the mount surface 18b for the LEDs 17 facing the end portions of the light guide member 19, the LEDs 17 can be disposed in an opposed manner with respect to the end portions of the light guide member 19. Therefore, excellent workability can be obtained.

The LED boards 18 have an elongated shape extending along the end portions of the light guide member 19, with a plurality of the LEDs 17 disposed side by side in a line along the long side direction of the LED boards 18. In this way, because the plurality of the LEDs 17 is disposed side by side in a line along the end portions of the light guide member 19, the light from the LEDs 17 can be efficiently incident on the end portions of the light guide member 19.

On the LED boards 18, the light source side connectors 24 connected to the LEDs 17 and facing the hole portions 33 are mounted, and the relaying and connecting parts 21 are engagingly connected to the light source side connectors 24 through the hole portions 33. In this way, by disposing the LED boards 18 in the chassis 14, not only the LEDs 17 mounted on the LED boards 18 but also the light source side connectors 24 connected to the LEDs 17 can be disposed at respective predetermined positions. Thus, excellent workability can be obtained. When the relaying and connecting parts 21 are inserted through the hole portions 33, the relaying and connecting parts 21 are engagingly connected to the light source side connectors 24 facing the hole portions 33 in the chassis 14. Thus, better workability can be obtained.

The light source side connectors 24 are mounted on the mount surface 18b of the LED boards 18 for the LEDs 17. In this way, the LED boards 18 of the single-side mount type can be used, reducing the manufacturing cost for the LED boards 18.

The light source side connectors 24 are disposed at positions displaced from the LED group 23 including a plurality of the LEDs 17 disposed side by side in a line on the LED boards 18, with respect to the short side direction of the LED boards 18. In this way, compared with a case where the light source side connectors are displaced from the LED group 23 with respect to the long side direction of the LED boards 18, the size of the LED boards 18 in the long side direction can be decreased.

The light source side connectors 24 are disposed side by side with the LEDs 17 of the LED group 23 in the short side direction of the LED boards 18. In this way, compared with a case where the light source side connectors are disposed at positions displaced from the LED group 23 in the short side direction and displaced from the LEDs 17 of the LED group 23 in the long side direction, the distance between the LEDs 17 and the light source side connectors 24 can be decreased.

Thus, when the LEDs 17 and the light source side connectors 24 are connected by the wiring pattern 18a, the length of the wiring pattern 18a can be decreased.

The light source side connectors 24 are disposed side by side, in the short side direction, with the outer-most LEDs 17 of the LED group 23 in the long side direction. In this way, compared with a case where the light source side connectors are disposed closer to the center than the outer-most LEDs 17 in the long side direction, the distance between the outer-most LEDs 17 and the light source side connectors 24 can be decreased. Thus, when the outer-most LEDs 17 and the light source side connectors 24 are connected by the wiring pattern 18a, for example, the length of the wiring pattern 18a can be decreased. Further, compared with a case where the light source side connectors are disposed even closer to the ends of the LED boards 18 than the outer-most LEDs 17 in the long side direction, the size of the LED boards 18 in the longitudinal direction can be decreased.

The LEDs 17 are disposed closer to one front-side end of the LED boards 18 in the short side direction, while the light source side connectors 24 are disposed closer to the other rear-side end of the LED boards 18 with respect to the short side direction. In this way, the LEDs 17 and the light source side connectors 24 displaced from each other in the short side direction can be efficiently disposed on the LED boards 18.

The light source side connectors 24 are disposed on the opposite side to the light output side of the light guide member 19 with respect to the LEDs 17. In this way, the light source side connectors 24 are not easily visually recognized as dark areas. Thus, uneven brightness can be prevented in a preferred manner.

The light source side connectors 24 are disposed at the end portions of the LED boards 18 in the long side direction. In this way, compared with a case where the light source side connectors are disposed at the center of the LED boards 18 in the long side direction, the light source side connectors 24 are not easily visually recognized as dark areas. Thus, uneven brightness can be prevented in a preferred manner.

The light source side connectors 24 are formed at the ends of the LED boards 18 in the long side direction, and a pair of the relaying and connecting parts 21 is arranged to be separated from each other in the long side direction corresponding to the light source side connectors 24. In this way, by adapting the relaying and connecting parts 21 disposed at the one end portion of the LED boards 18 in the long side direction for the input side and the relaying and connecting parts 21 disposed at the other end portion for the output side, the plurality of the LEDs 17 mounted on the LED boards 18 can be driven. Because the light source side connectors 24 and the relaying and connecting parts 21 are disposed at both ends of the LED boards 18 in the long side direction, the distance between the outer-most LEDs 17 on the LED boards 18 in the long side direction and the light source side connectors 24 can be decreased. Thus, when the LEDs 17 and the light source side connectors 24 are connected by the wiring pattern 18a, for example, an undesirable increase in the length of the wiring pattern 18a can be avoided.

The chassis 14 includes the bottom plate 14a disposed on the opposite side to the light output side of the light guide member 19. In the bottom plate 14a, the hole portions 33 are formed. In this way, because the hole portions 33 are formed in the bottom plate 14a disposed on the opposite side to the light output side of the light guide member 19, the hole portions 33 and the relaying and connecting parts 21 inserted therein are not easily visually recognized as dark areas. Thus, uneven brightness can be prevented in a preferred manner.

The chassis 14 also includes the side plates 14b rising from the outer ends of the bottom plate 14a disposed in an opposed manner with respect to the end portions of the light guide member 19. The LEDs 17 are attached to the side plates 14b. In this way, the LEDs 17 can be disposed in an opposed manner with respect to the end portions of the light guide member 19 by attaching the LEDs 17 to the side plates 14b. Thus, excellent workability can be obtained.

The bottom plate 14a includes the light guide member support portion 25 supporting the light guide member 19, and the relaying and connecting part attaching portions 32 in which the hole portions 33 are formed and to which the relaying and connecting parts 21 are attached, the relaying and connecting part attaching portions 32 protruding more to the outside than the light guide member support portion 25. In this way, because the relaying and connecting part attaching portions 32 of the bottom plate 14a protrude more to the outside than the light guide member support portion 25, the space for installing the relaying and connecting parts 21 electrically connected to the LEDs 17 can be sufficiently ensured in the chassis 14.

The LEDs 17 and the end portion of the light guide member 19 disposed in an opposed manner thereto are spaced apart from each other with a space therebetween. The space is sandwiched between the pair of reflection sheets 22 and 26. In this way, the light emitted by the LEDs 17 is repeatedly reflected by the pair of reflection sheets 22 and 26 in the space provided between the LEDs 17 and the opposed end portions of the light guide member 19. Therefore, the light is incident on the end portions of the light guide member 19 efficiently. Thus, the light utilization efficiency can be improved.

There are also provided the electric power supply boards 20 disposed outside the chassis 14 and configured to supply electric power to the LEDs 17 via the relaying and connecting parts 21. In this way, electric power can be supplied from the electric power supply boards 20 to the LEDs 17 via the relaying and connecting parts 21.

On the electric power supply boards 20, the electric power supply side connectors 28 are provided, whereas in the chassis 14, the light source side connectors 24 connected to the LEDs 17 and facing the hole portions 33 are provided. The relaying and connecting parts 21 include the flexible electric wire portion 29 and the pair of the connector portions 30 and 31 provided at the ends of the electric wire portion 29. Of the pair of the connector portions 30 and 31, the second connector portion 31 is engagingly connected to the electric power supply side connectors 28, while the first connector portion 30 is configured to be engagingly connected to the light source side connectors 24 through the hole portions 33. In this way, by electrically engagingly connecting the first connector portion 30 and the second connector portion 31, which are provided at the ends of the electric wire portion 29, to the light source side connectors 24 and the electric power supply side connectors 28, respectively, the electric power supply from the electric power supply board 20 can be relayed to the LEDs 17. Because the electric wire portion 29 is flexible, good workability can be obtained when inserting or removing the connector portions 30 and 31. Thus, excellent workability can be obtained.

The light sources are the LEDs 17. In this way, high brightness and low power consumption can be achieved.

While the first embodiment of the present invention has been described above, the present invention is not limited to the embodiment and may include the following modifications. In the following modifications, components similar to those of the embodiment will be designated by similar reference signs and their description and illustration may be omitted.

First Modification of the First Embodiment

A first modification of the first embodiment will be described with reference to FIG. 8. In the first modification, a first connector portion 30-1 has a modified holding structure for the chassis 14.

Figure 8:
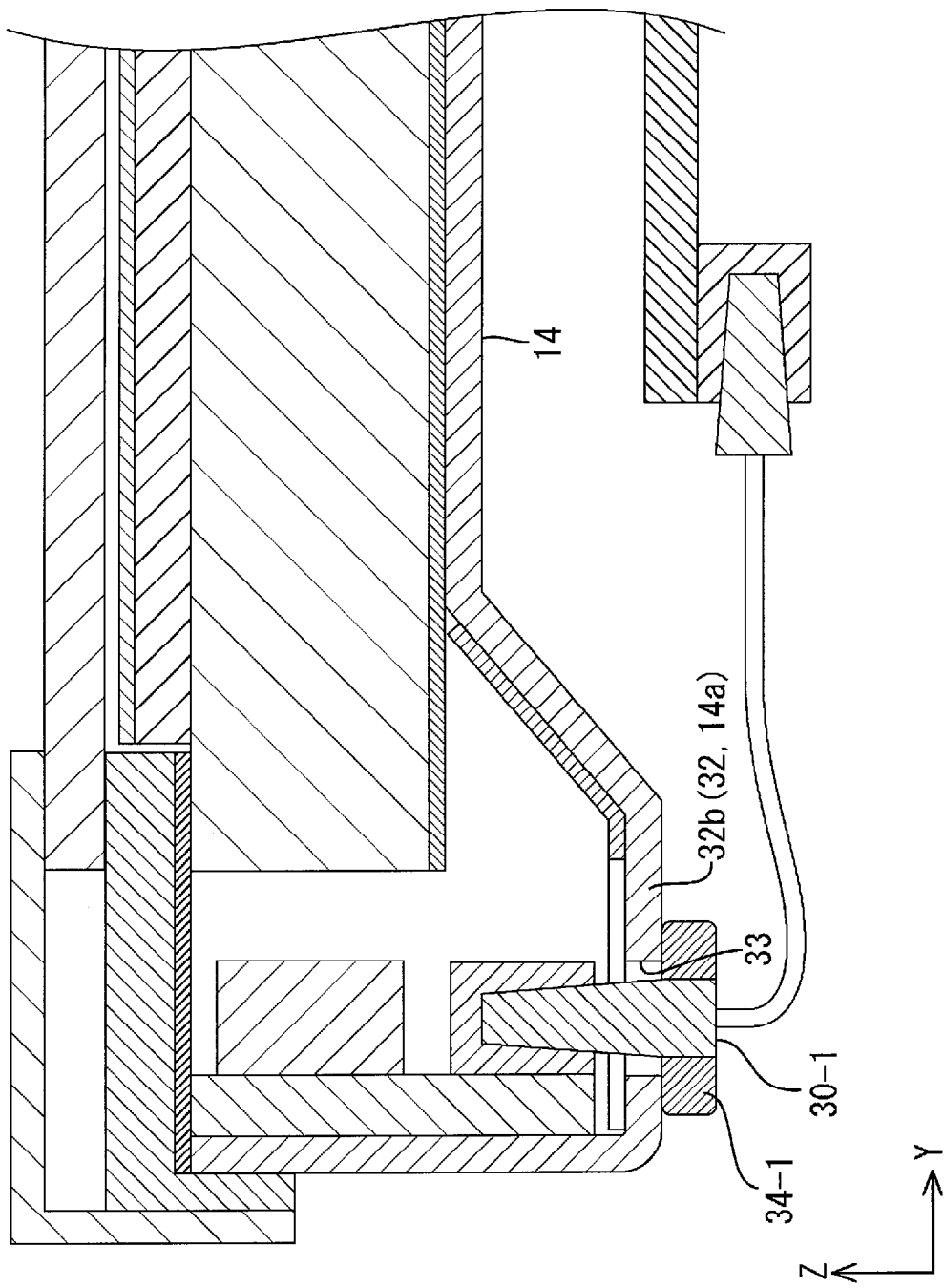
FIG. 8 is a cross sectional view illustrating the details of a connection structure connecting the LED board and the electric power supply board by a relaying and connecting part according to the first modification of the first embodiment.

The first connector portion 30-1 according to the present modification, as shown in FIG. 8, does not include the holding portions 35 according to the first embodiment; instead, a covering member 34-1 is fixed to the bottom plate 14a of the chassis 14 by an adhesive agent. Specifically, an adhesive agent is applied to the front side surface of the covering member 34-1 in advance, and then the first connector portion 30-1 is inserted into the hole portion 33 such that the covering member 34-1 is fixed onto the outer surface at the hole edges of the hole portion 33. Instead of an adhesive agent, a double-sided tape may be used.

Second Modification of the First Embodiment

A second modification of the first embodiment will be described with reference to FIG. 9. In the second modification, a first connector portion 30-2 has a modified holding structure for the chassis 14.

Figure 9:
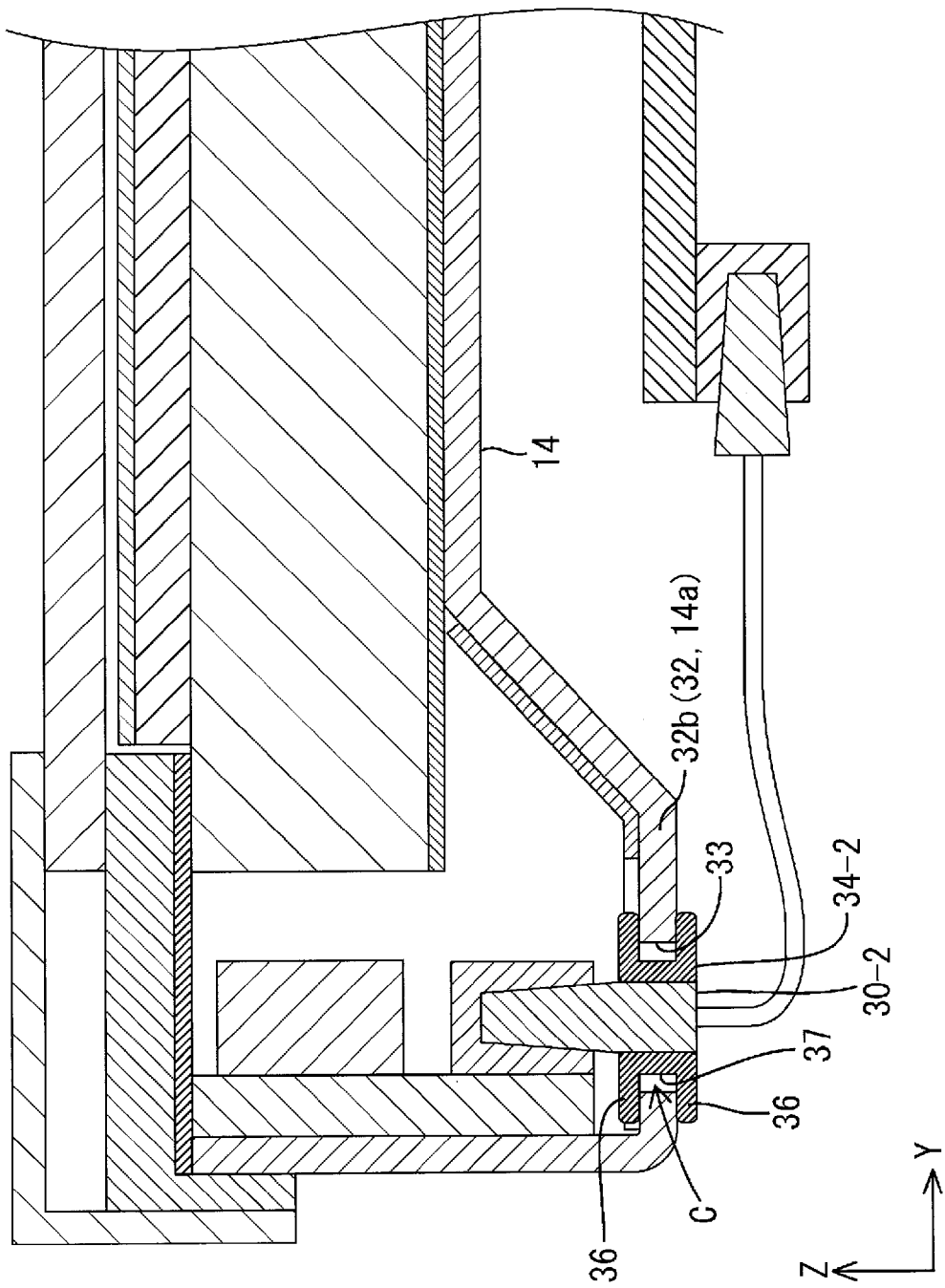
FIG. 9 is a cross sectional view illustrating the details of a connection structure connecting the LED board and the electric power supply board by a relaying and connecting part according to the second modification of the first embodiment.

The first connector portion 30-2 according to the present modification, as shown in FIG. 9, does not have the holding portions 35 according to the first embodiment; instead, a covering member 34-2 includes sandwiching portions 36 sandwiching the hole edge of the hole portion 33. Specifically, the covering member 34-2 has a groove portion 37 at the center in the thickness direction (the Z-axis direction). The groove portion 37 has an opening to the outside over the entire circumference of the covering member 34-2 to form a pair of the sandwiching portions 36 of flange-like shape across the groove portion 37, respectively on the front and rear sides. The sandwiching portions 36 of the covering member 34-2 have an outer diameter larger than the diameter of the hole portion 33, whereas the groove portion 36 has an outer diameter smaller than the diameter of the hole portion 33 by approximately the clearance C. Thus, if the first connector portion 30-2 is inserted into the hole portion 33, the hole edge of the hole portion 33 is fitted in the groove portion 37 of the covering member 34-2 and elastically sandwiched between the pair of the sandwiching portions 36 one of which is disposed in the chassis 14 and the other one of which is disposed outside the chassis 14. Accordingly, the clearance C can be covered by the covering member 34-2 while holding of the first connector portion 30-2 is ensured.

Third Modification of the First Embodiment

A third modification of the first embodiment will be described with reference to FIG. 10. In the third modification, a first connector portion 30-3 has a modified holding structure with respect to the chassis 14.

Figure 10:
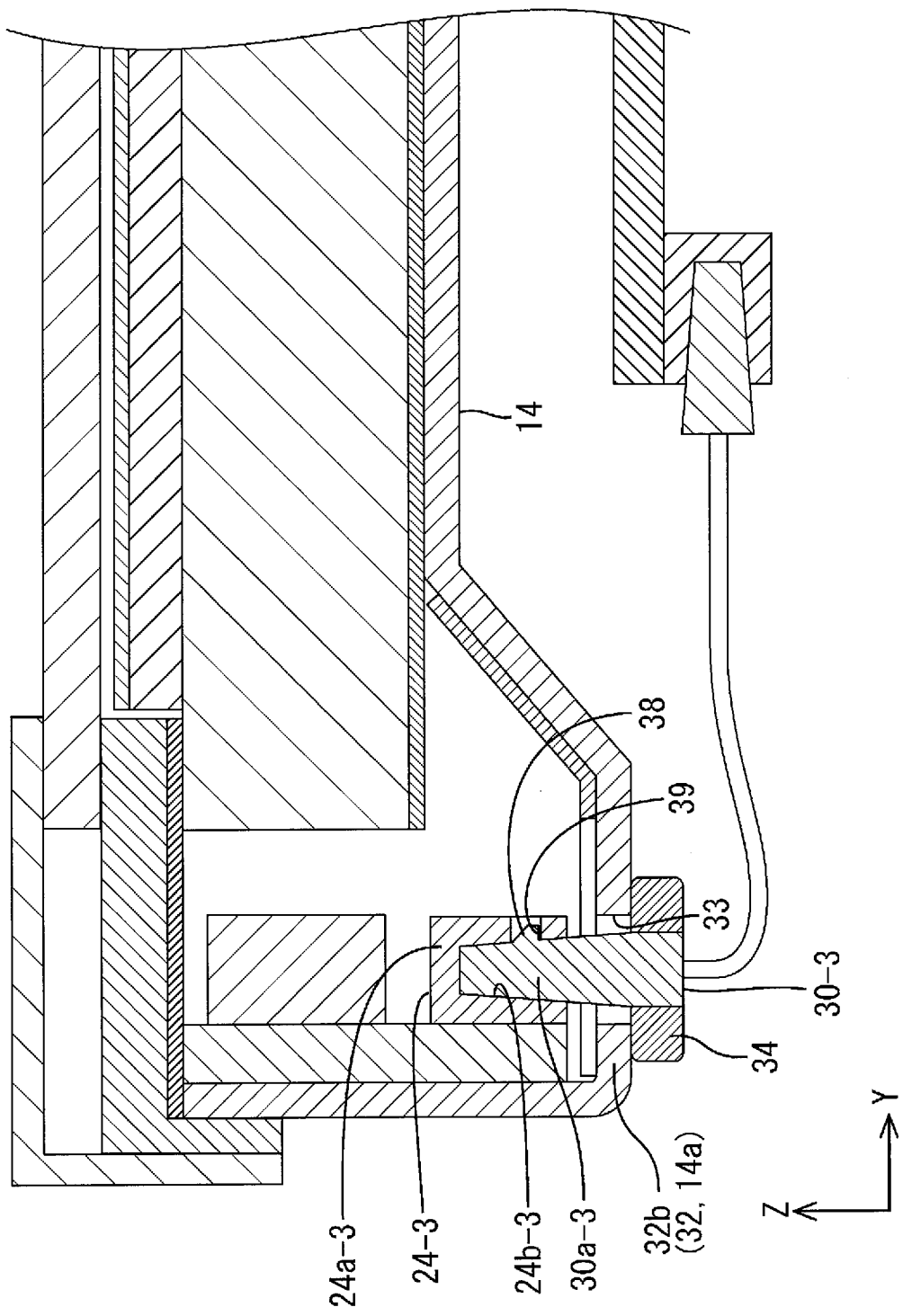
FIG. 10 is a cross sectional view illustrating the details of a connection structure connecting the LED board and the electric power supply board by a relaying and connecting part according to the third modification of the first embodiment.

The first connector portion 30-3 according to the present modification, as shown in FIG. 10, does not include the holding portions 35 according to the first embodiment; instead, a holding structure is provided between the first connector portion 30-3 and a light source side connector 24-3. Specifically, a housing 30a-3 of the first connector portion 30-3, which is engaged in the light source side connector 24-3, has a locking protrusion 38 formed on the engaging outer surface of the housing 30a-3. On the other hand, a housing 24a-3 of the light source side connector 24-3 has a locking hole portion 39 formed in the side wall surrounding the engaging recess 24b-3 for receiving the locking protrusion 38. The locking hole portion 39 is a through hole communicating inside and outside of the engaging recess 24b-3, and configured to be locked by the locking protrusion 38 on the hole edge thereof. When the first connector portion 30-3 is inserted into the hole portion 33 and the front end portion thereof is engaged in the engaging recess 24b-3 of the light source side connector 24-3, the locking protrusion 38 is locked on the hole edge of the locking hole portion 39, whereby the first connector portion 30-3 is held in an engaged state with respect to the light source side connectors 24-3, while the covering member 34 is maintained in an abutting state with respect to the outer surface of the bottom plate 14a of the chassis 14.

Fourth Modification of the First Embodiment

A fourth modification of the first embodiment will be described with reference to FIG. 11. In the fourth modification, an LED board 18-4 has a modified attaching structure for a chassis 14-4.

Figure 11:
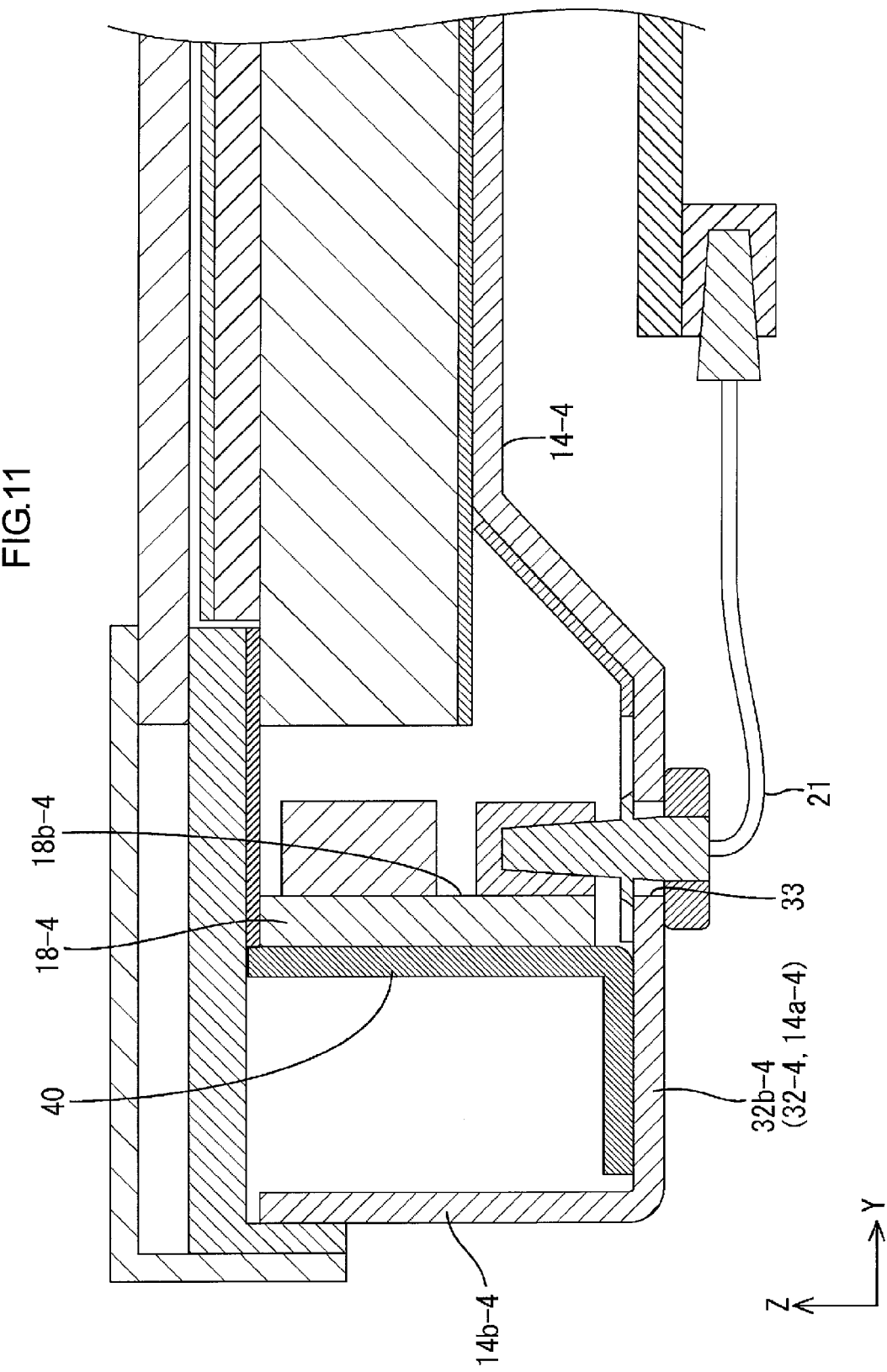
FIG. 11 is a cross sectional view illustrating the details of a connection structure connecting the LED board and the electric power supply board by a relaying and connecting part according to the fourth modification of the first embodiment.

The LED board 18-4 according to the present modification, as shown in FIG. 11, is not directly attached to the chassis 14 not as according to the first embodiment; instead, the LED board 18-4 is indirectly attached to the chassis 14-4 via a bracket member 40. Specifically, the bracket member 40 is disposed within a space ensured between a side plate 14b-4 and the hole portions 33 (the space closer to the outside than the relaying and connecting part 21) on an outer end portion 32b-4 of a relaying and connecting part attaching portion 32-4 of a bottom plate 14a-4. The bracket member 40 is fixed onto the outer end portion 32b-4 of the relaying and connecting part attaching portion 32-4 of the bottom plate 14a-4 with screws or the like. The bracket member 40 is made of a metal plate material and has an L-shaped cross section. To the bracket member 40, the LED board 18-4 is fixed, with screws, on the opposite side surface to a mount surface 18b-4.

Fifth Modification of the First Embodiment

A fifth modification of the first embodiment will be described with reference to FIG. 12. In the fifth embodiment, the arrangement of a covering member 34-5 with respect to a relaying and connecting part 21-5 is modified.

Figure 12:
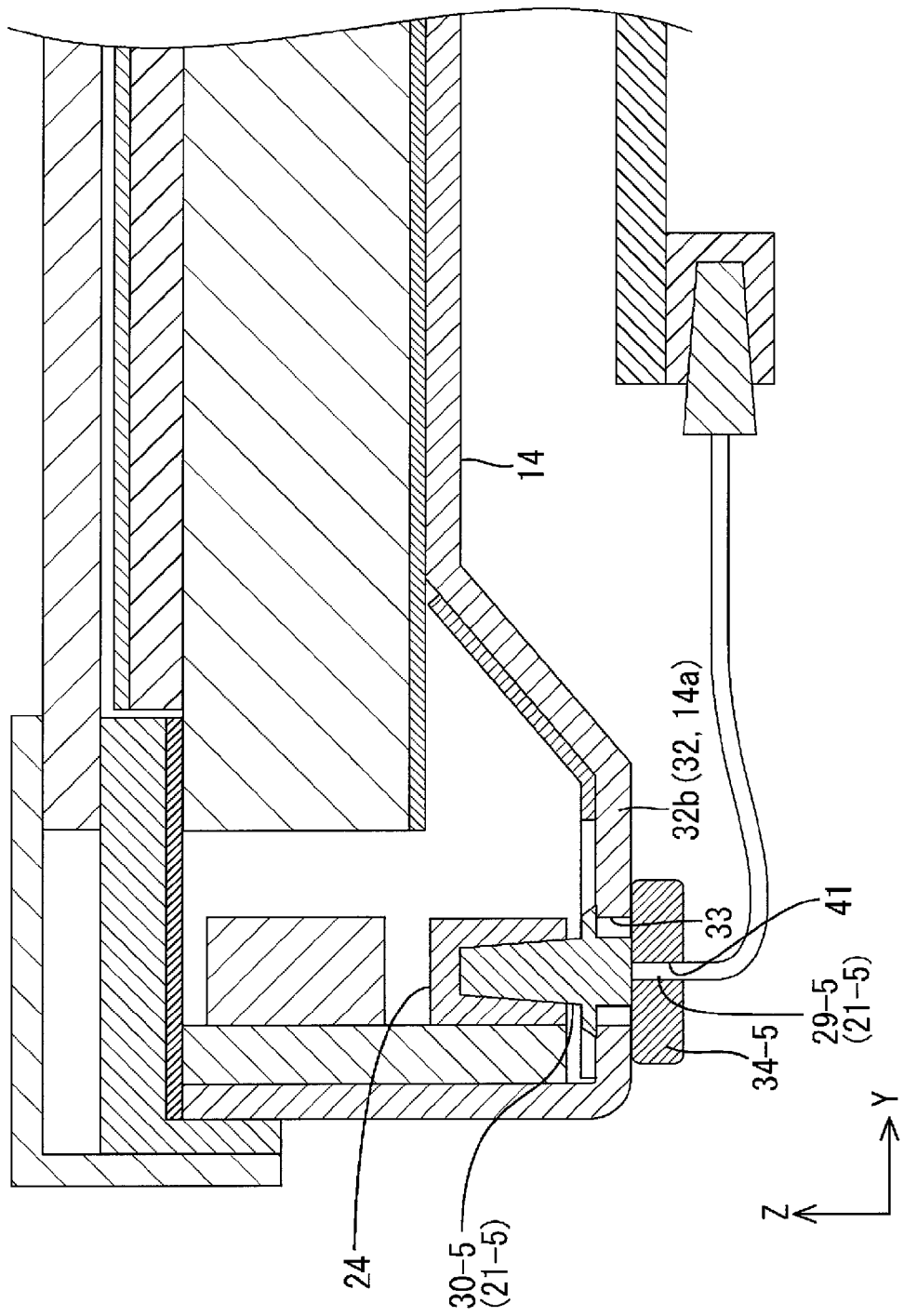
FIG. 12 is a cross sectional view illustrating the details of a connection structure connecting the LED board and the electric power supply board by a relaying and connecting part according to the fifth modification of the first embodiment.

In the relaying and connecting part 21-5 according to the present modification, as shown in FIG. 12, the covering member 34-5 is integrally mounted on an electric wire portion 29-5, unlike the first embodiment in which the covering member 34 is mounted on the first connector portion 30. Specifically, the covering member 34-5 has a ring shape surrounding the electric wire portion 29-5; in other words, the covering member 34-5 has an electric wire insertion hole 41 formed at the center, through which the electric wire portion 29-5 penetrates. The covering member 34-5 is disposed at a position adjacent to a first connector portion 30-5 on the electric wire portion 29-5. The covering member 34-5 abuts on the rear end surface of the first connector portion 30-5 in the engaging direction with the front side surface thereof. Thus, when inserting the first connector portion 30-5 into the hole portion 33, the covering member 34-5 is pushed onto the bottom plate 14a as the first connector portion 30-5 advances into the hole portion 33. As a result, the first connector portion 30-5 can be engaged in the light source side connector 24 to a predetermined depth, while the covering member 34-5 can be abutted on the outer surface at the hole edge of the hole portion 33.

The first connector portion 30-5 is sized to be entirely accommodated within the hole portion 33 without protruding outside when in the attached state.

Second Embodiment

A second embodiment of the present invention will be described with reference to FIGS. 13 to 17. The second embodiment differs from the first embodiment in that a direct backlight unit 112 is used. Redundant description of structures, operations, and effects similar to those of the first embodiment will be omitted.

Figure 13:
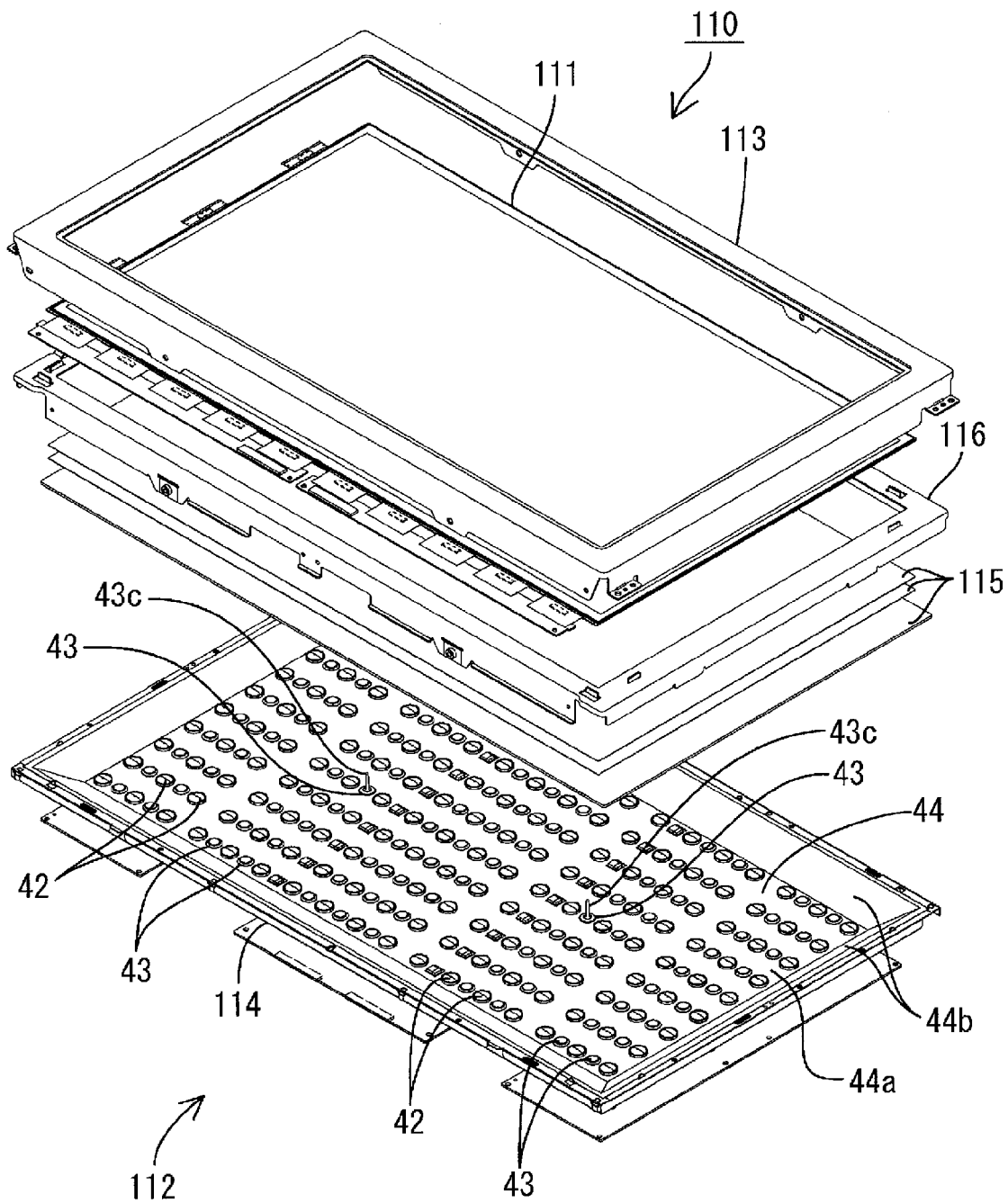
FIG. 13 is an exploded perspective view of a liquid crystal display device according to the second embodiment of the present invention.

In a liquid crystal display device 110 according to the present embodiment, as shown in FIG. 13, a liquid crystal panel 111 and the direct backlight unit 112 are integrated by a bezel 113 and the like. The configuration of the liquid crystal panel 111 is similar to the first embodiment; thus, redundant description will be omitted. In the following, a configuration of the direct backlight unit 112 will be described.

The backlight unit 112, as shown in FIG. 13, includes a substantially box-shaped chassis 114 with an opening on the light output surface side (toward the liquid crystal panel 11); a group of optical members 115 covering the opening of the chassis 114; and a frame 116 arranged along the outer edges of the chassis 114 and holding the outer edges of the group of optical members 115 in a sandwiched manner with the chassis 114. The chassis 114 houses LEDs 117 immediately under the optical members 115 (liquid crystal panel 111) in an opposed manner thereto; LED boards 118 on which the LEDs 117 are mounted; diffuser lenses 42 attached to the LED boards 118 at positions corresponding to the LEDs 117; and holding members 43 holding the LED boards 118 in an attached state with respect to the chassis 114. The chassis 114 also houses a reflection sheet 44 for reflecting the light within the chassis 114 toward the optical members 115. Thus, the backlight unit 112 according to the present embodiment is of the direct type, without the light guide member 19 of the edge light backlight unit 12 according to the first embodiment. The configuration of the optical members 115 is similar to the first embodiment; thus, redundant description will be omitted. Description of the configuration of the frame 116 is omitted as it is also similar to the first embodiment with the exception that the first reflection sheet 22 is absent. In the following, the constituent parts of the backlight unit 112 will be described in detail.

Figure 14:
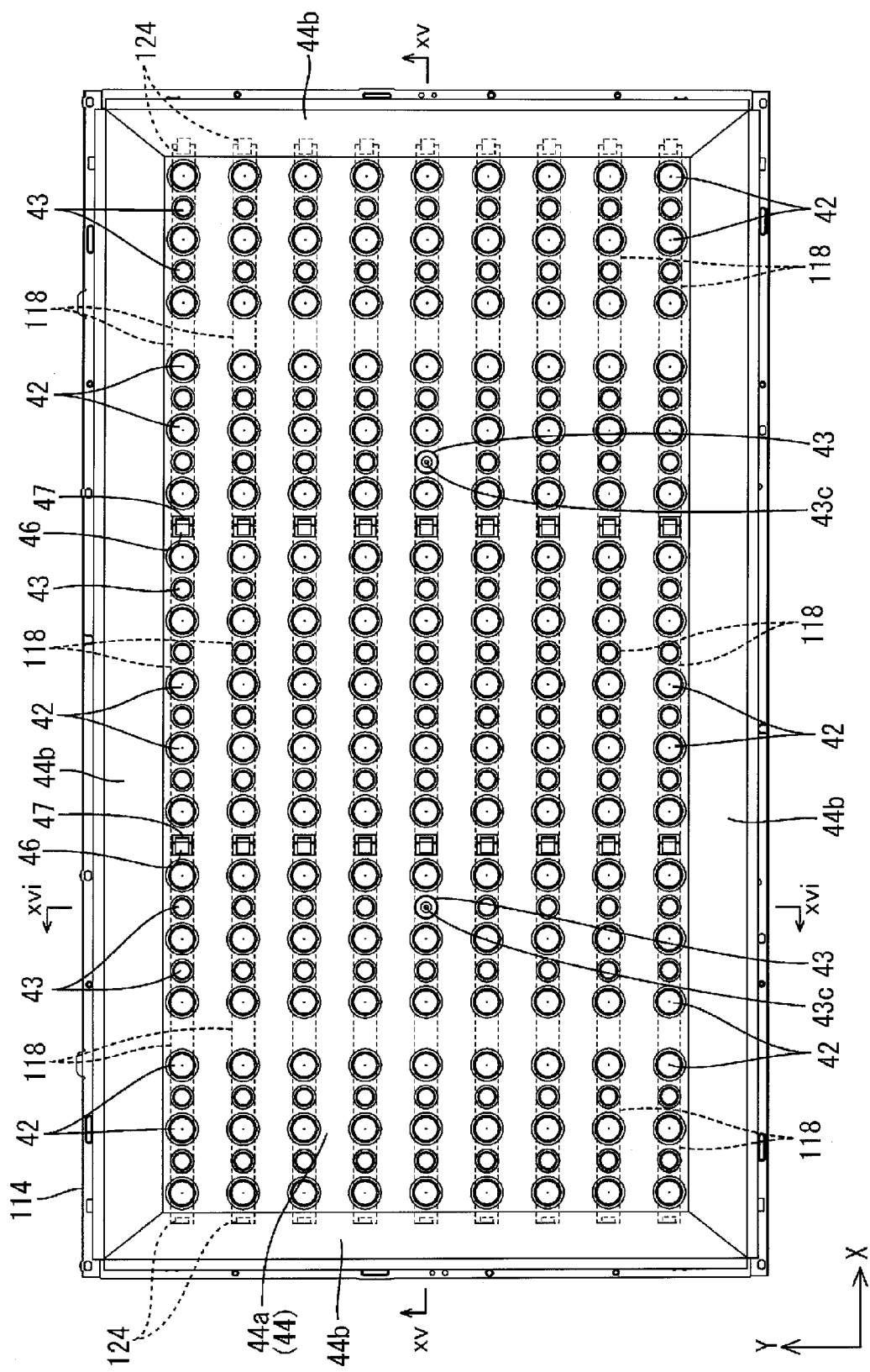
FIG. 14 is a plan view illustrating an arrangement of diffuser lenses, LED boards, a reflection sheet, and holding members in the chassis of the liquid crystal display device.
Figure 15:
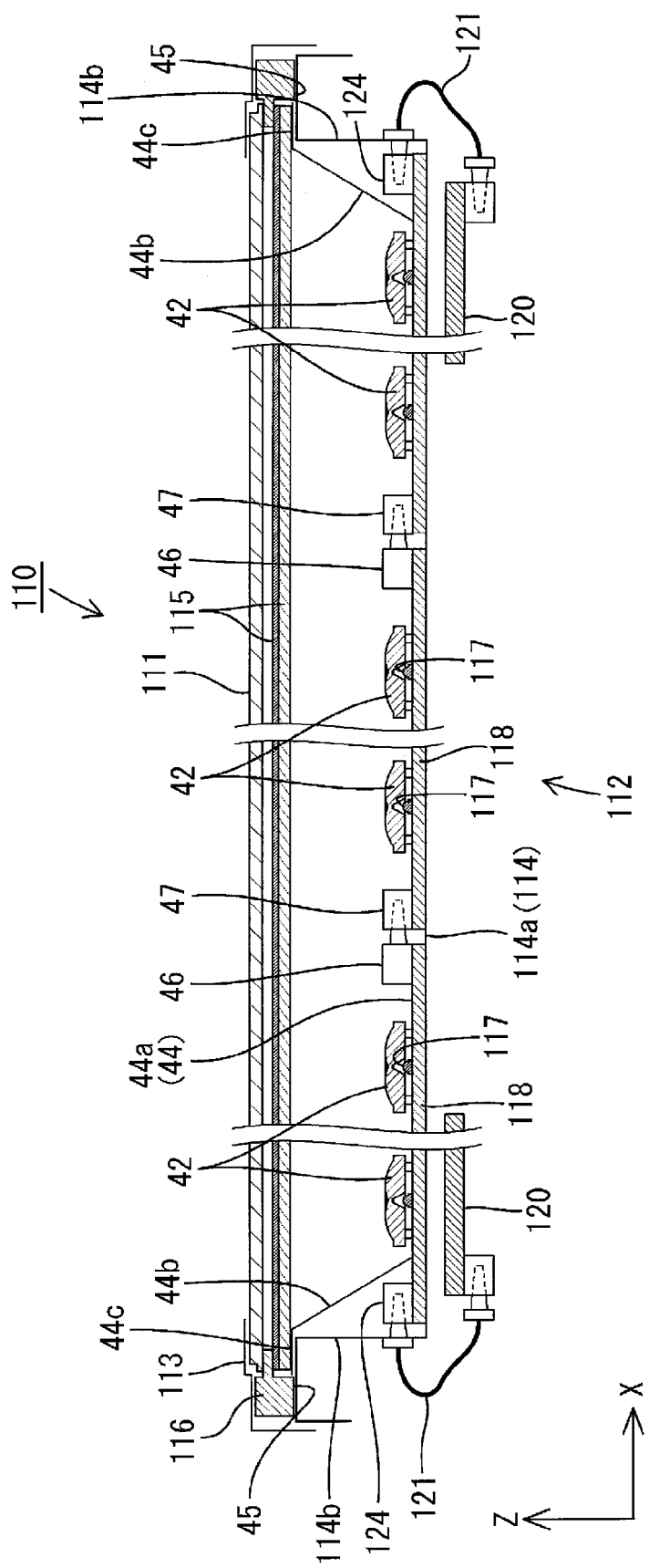
FIG. 15 shows a cross section taken along line xv-xv of FIG. 14.
Figure 16:
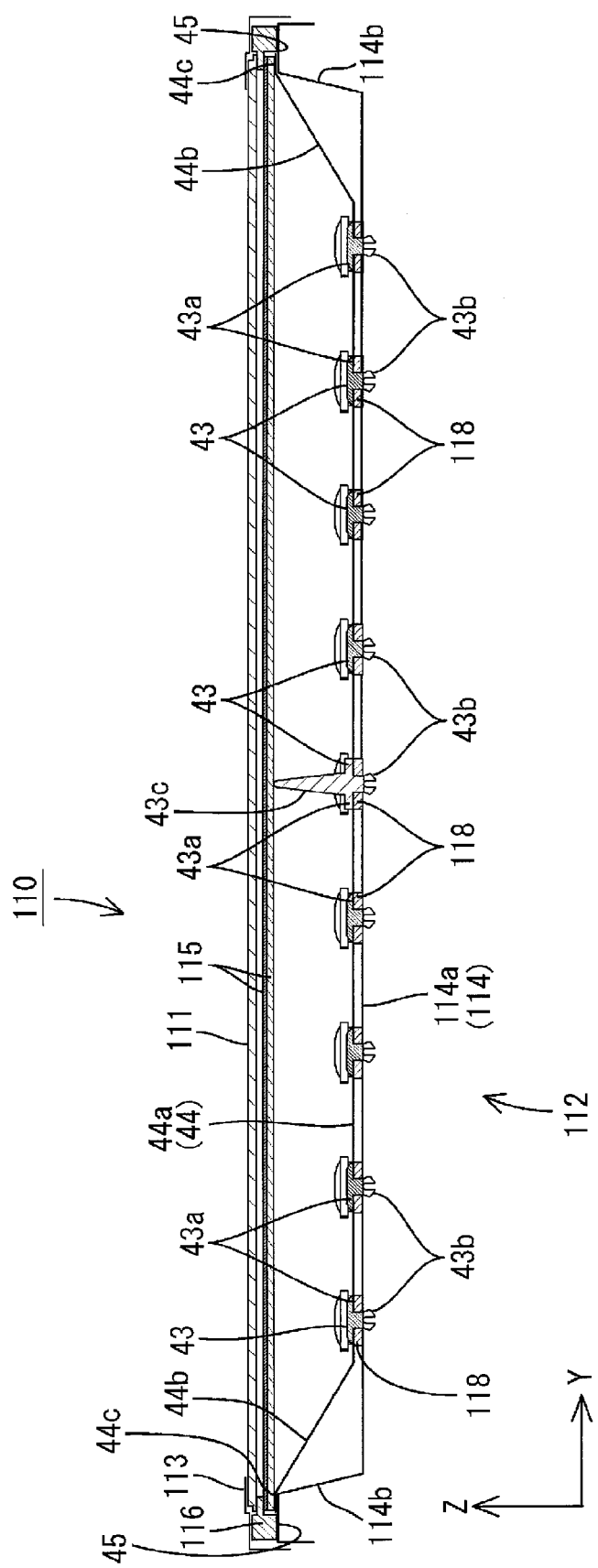
FIG. 16 shows a cross section taken along line xvi-xvi of FIG. 14.

The chassis 114 is made of metal and, as shown in FIGS. 14 to 16, includes a bottom plate 114$a$ with a horizontally long square shape (rectangular shape) similar to the liquid crystal panel 111; side plates 114$b$ rising from the outer ends of the bottom plate 114$a$ along the sides thereof (a pair of long sides and a pair of short sides) toward the front side (light output side); and backing plates 45 extending outward from the rising ends of the side plates 114$b$. Thus, the chassis 114 as a whole has a shallow box-like shape (substantially shallow dish-like shape) with an opening on the front side. The chassis 114 has a long side direction aligned with the X-axis direction (the horizontal direction) and a short side direction aligned with the Y-axis direction (the vertical direction). The backing plates 45 of the chassis 114 are configured to receive the frame 116 and the optical members 115 from the front side, as will be described later. The frame 116 is threadably attached on the backing plates 45. The bottom plate 114$a$ of the chassis 114 has attaching holes for the each holding members 43.

Next, the LED board 118 on which LEDs 117 are mounted will be described in detail. The configuration of the LEDs 117 is similar to the first embodiment; thus, redundant description will be omitted. The LED board 118 includes a base member of a horizontally long square shape in a plan view. The LED board 118 is housed in the chassis 114 along the bottom plate 114$a$ with a long side direction aligned with the X-axis direction and a short side direction aligned with the Y-axis direction. On the front side surface of the plate surfaces of the base member of the LED board 118 (i.e., facing the optical members 115), the LEDs 117 are surface-mounted. The light emitting surfaces of the LEDs 117 are opposed to the optical members 115 (the liquid crystal panel 111) with their optical axis LA aligned with the Z-axis direction, which is orthogonal to the display surface of the liquid crystal panel 111. Specifically, a plurality of the LEDs 117 is arranged linearly side by side on the LED board 118 along the long side direction (X-axis direction) thereof, and connected in series by a wiring pattern formed on the LED board 118. The LEDs 117 have a substantially constant arrangement pitch; namely, the LEDs 117 are arranged at regular intervals.

As shown in FIG. 14, a plurality of the LED boards 118 with the above configuration is arranged side by side in the X-axis direction and the Y-axis direction in the chassis 114, with their long side directions and short side directions aligned with each other. Namely, the LED boards 118 and the LEDs 117 mounted thereon are arranged in rows and columns (in a matrix or planar arrangement) in the chassis 114, the row direction corresponding to the X-axis direction (the long side direction of the chassis 114 and the LED boards 118) and the column direction corresponding to the Y-axis direction (the short side direction of the chassis 114 and the LED boards 118). Specifically, a total of 27 LED boards 118, i.e., three in the X-axis direction times nine in the Y-axis direction, are arranged side by side in the chassis 114. According to the present invention, two types of the LED boards 118 are used, which differ in the long-side dimension (the length in the long side direction) and the number of the LEDs 117 that are mounted. Specifically, a six LED mount type and a five LED mount type are used. The six LED mount type carries six LEDs 117 and has a relatively long long-side dimension. The five LED mount type carries five LEDs 117 and has a relatively short long-side dimension. Along the X-axis direction in the chassis 114, one six LED mount type is disposed at each end and one five LED mount type is disposed at the center between the two LED boards of the six LED mount type.

Of the end portions of each of the three LED boards 118 arranged in the X-axis direction within the chassis 114, the end portions facing the adjacent LED boards 118 include inter-board connectors 46 and 47, as shown in FIG. 15. The inter-board connectors 46 and 47 are surface-mounted on a mount surface 118$b$ of the LED boards 118 for the LEDs 117. The inter-board connectors 46 are convex while the inter-board connectors 47 are concave such that they can be engaged with each other in a mated manner. Specifically, the convex inter-board connectors 46 and the concave inter-board connectors 47 are disposed at one end portion and the other end portion of the adjacent LED boards 118, respectively. By engaging the convex and concave inter-board connectors 46 and 47 with each other in a mated manner, the wiring patterns (not shown) on the adjacent LED boards 118 can be electrically connected.

Figure 17:
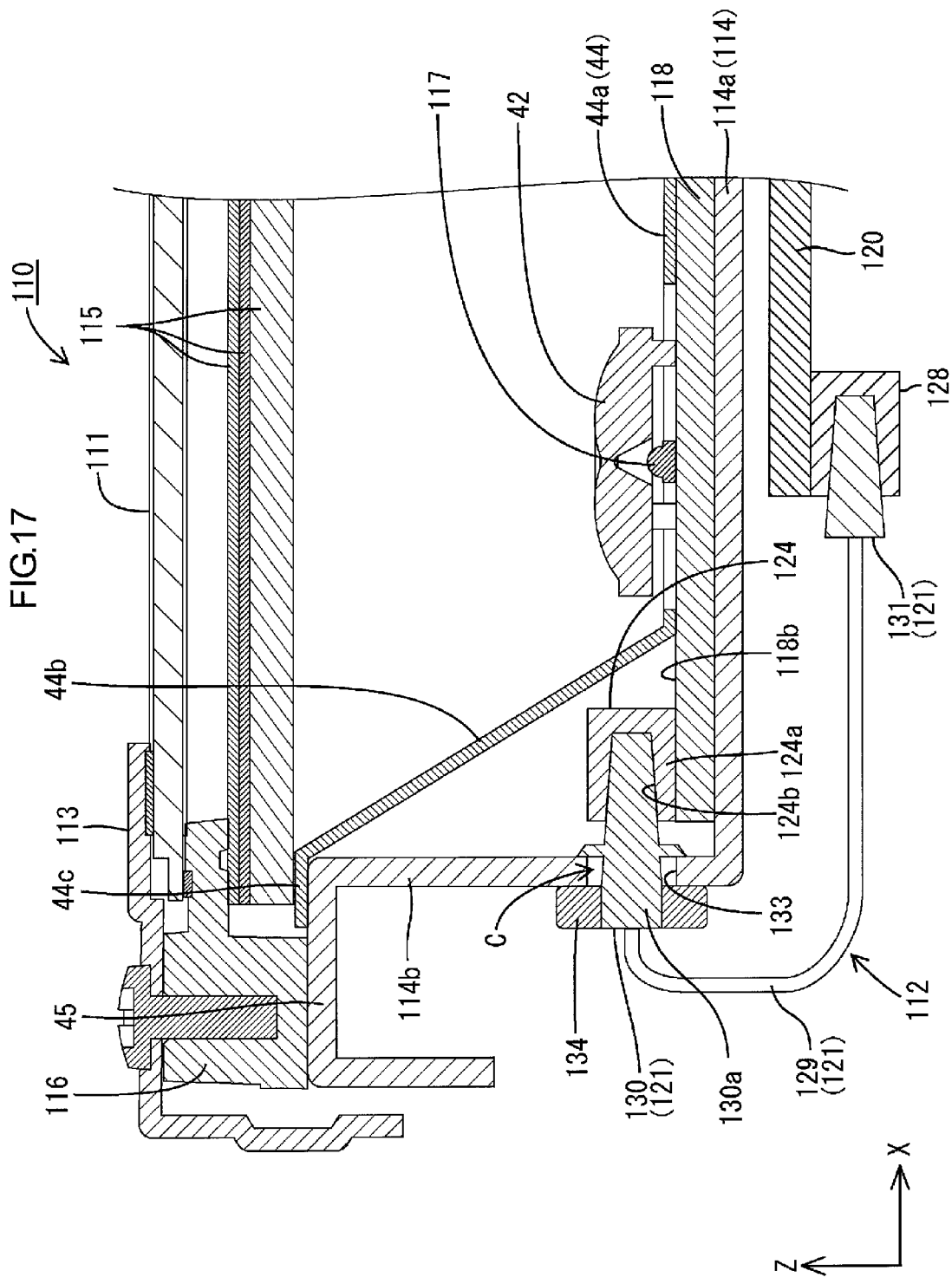
FIG. 17 is a cross sectional view illustrating the details of the connection structure connecting the LED board and the electric power supply board by a relaying and connecting part.

The diffuser lenses 42 are made of a substantially transparent (highly light transmissive) synthetic resin material with a refractive index higher than air (such as polycarbonate or acrylic material). The diffuser lenses 42 have a predetermined thickness and a substantially circular shape in a plan view, as shown in FIGS. 15 and 17. The diffuser lenses 42 are attached to the LED boards 118 to cover the LEDs 117 individually from the front side, that is, the diffuser lenses 42 overlap with the LEDs 117 in plan view. The diffuser lenses 42 are configured to output the light emitted by the LEDs 117, which has strong directionality, in a diffusing manner. Specifically, the light emitted by the LEDs 117 passes through the diffuser lenses 42 to reduce its directionality. Therefore, the regions between the adjacent LEDs 117 can be prevented from being visually recognized as being dark even when the intervals between the LEDs 117 are increased. Thus, the number of LEDs 117 installed can be decreased. The diffuser lenses 42 are substantially coaxial with the LEDs 117 in plan view.

The holding member 43 is made of a synthetic resin, such as polycarbonate resin, and have a white surface with excellent light reflectivity. The holding member 43, as shown in FIGS. 14 and 16, includes a main body portion 43a extending along the plate surface of the LED boards 118, and a fixing portion 43b protruding from the main body portion 43a toward the rear side, i.e., the chassis 41, to be fixed to the chassis 41. The main body portion 43a has a substantially circular plate-like shape in plan view and sandwiches the LED boards 118 and the reflection sheet 44, which will be described in detail later, with the bottom plate 114a of the chassis 114. The fixing portion 43b penetrates through insertion holes and the attaching holes, which are respectively formed in the LED boards 118 and the bottom plate 114a of the chassis 114 at positions corresponding to the attaching positions of the holding members 43, to be locked on the bottom plate 114a. As shown in FIG. 14, a number of the holding members 43 are arranged side by side in rows and columns on the plane of the LED boards 118. Specifically, the holding members 43 are arranged between the adjacent diffuser lenses 42 (LEDs 117) with respect to the X-axis direction.

As shown in FIG. 16, a pair of the holding members 43 arranged at the center of the screen include a support portion 43c protruding from the main body portion 43a toward the front side. The support portion 43c is configured to support the optical members 115 from the rear side to maintain a constant positional relationship between the LEDs 117 and the optical members 115 in the Z-axis direction and thereby to prevent unexpected deformation of the optical members 115.

Next, the reflection sheet 44 will be described. The reflection sheet 44 is made of a synthetic resin and has a white surface with excellent light reflectivity. The reflection sheet 44 has a size covering substantially the entire inner surface of the chassis 114; namely, the reflection sheet 44 is sized to cover all of the LED boards 118 disposed in a planar manner along the bottom plate 114a. The reflection sheet 44 is configured to reflect the light within the chassis 114 toward the optical members 115. The reflection sheet 44 extends along the bottom plate 114a of the chassis 114 and includes a bottom portion 44a of a size covering most of the bottom plate 114a; four rising portions 44b rising from the outer ends of the bottom portion 44a toward the front side and inclined with respect to the bottom portion 44a; and extension portions 44c extending outwardly from the outer ends of the rising portions 44b and received on backing plates 45 of the chassis 114. The bottom portion 44a of the reflection sheet 44 overlaps with the front side surface of the LED boards 118, i.e., the mount surface 118b for the LEDs 117 on the front side. The reflection sheet 44 has holes for the diffuser lenses 42 and holes for the holding members 43 at corresponding positions.

As shown in FIG. 15, of the three LED boards 118 arranged along the X-axis direction in the chassis 114, the LED board 118 positioned at each end includes a light source side connector 124 at its end portion closer to the end in the long side direction. The light source side connector 124 is engagingly connected to a first connector portion 130 of relaying and connecting part 121. The light source side connector 124, as shown in FIG. 17, is surface-mounted on the mount surface 118b of the LED board 118 for the LEDs 117 and the interboard connectors 46 and 47. The light source side connector 124 includes a housing 124a with an engaging recess 124b opened toward the side plate 114b on the short side. The light source side connector 124 is disposed between the rising portion 44b of the reflection sheet 44 and the side plate 114b. The side plate 114b of the chassis 114 on the short side includes a hole portion 133 through which the first connector portion 130 of the relaying and connecting part 121 can be inserted. Through the hole portion 133, the engaging recess 124b of the light source side connector 124 is exposed to the lateral outside of the chassis 114. As the first connector portion 130 of the relaying and connecting part 121 is inserted through the hole portion 133 from outside the chassis 114 along the X-axis direction, the front end portion of the first connector portion 130 is engaged in the engaging recess 124b of the light source side connector 124 facing the hole portion 133, while a covering member 134 is abutted on the hole edge of the hole portion 133, whereby the clearance C between the first connector portion 130 and the hole portion 133 can be covered. Thus, an electric power supply board 120 can be electrically connected to the LEDs 117 on the LED board 118 to supply electric power, and the entry of dust or the like into the chassis 114 via the hole portion 33 can be prevented.

As described above, according to the present embodiment, the chassis 114 includes the bottom plate 114a disposed on the opposite side to the light output side with respect to the LEDs 117. The optical members 115 are disposed on the light output side in an opposed manner with respect to the bottom plate 114a and the LEDs 117. In this way, the light emitted from the LEDs 117 is irradiated onto the optical members disposed on the light output side in an opposed manner with respect to the bottom plate 114a and the LEDs 117, and is then output to the outside via the optical members 115.

The chassis 114 also includes the side plates 114b rising from the outer ends of the bottom plate 114a. The side plates 114b have the hole portions 133. In this way, connection to the LEDs 117 in the chassis 114 can be easily established by inserting the relaying and connecting parts 121 through the hole portions 133 of the side plates 114b from outside the chassis 114. Further, the thickness of the backlight unit 112 can be decreased in a suitable manner.

Other Embodiments

The present invention is not limited to the embodiments above described and illustrated with reference to the drawings, and the following embodiments may be included in the technical scope of the present invention.

(1) Besides the first embodiment, the procedure for assembling the liquid crystal display device may be modified as appropriate. For example, the LED boards and the electric power supply boards may be attached to the chassis first, the relaying and connecting parts may be attached next, and then the second reflection sheets, the light guide member, the frame and the like may be attached.

(2) Other than (1), the first connector portion of the relaying and connecting parts may be first attached through the hole portion of the chassis, and then the LED boards may be attached to the chassis.

(3) In the foregoing embodiments, the covering member is fitted as a separate component from the housing of the first connector portion. However, the covering member may be integrally formed with the housing two color molding, for example.

(4) In the foregoing embodiments, the covering member is integrally provided on the relaying and connecting part side. However, the covering member may be integrally provided on the chassis side.

(5) In the foregoing embodiments, the covering member is made of a rubber material. However, the covering member may be made of an elastic material other than a rubber material.

(6) In the foregoing embodiments, the covering member is made of an elastic material. However, the material of the covering member may be other than an elastic material, such as a synthetic resin material with a hardness lower than that of the housing.

(7) In the foregoing embodiments, the light source side connectors are concave while the first connector portion is convex. However, the present invention also includes an opposite configuration in which the light source side connectors are convex and the first connector portion is concave.

(8) In the foregoing embodiments, the electric power supply boards and the LED boards are directly connected by the relaying and connecting parts. However, a relay board may be interposed between the electric power supply boards and the LED boards, and the relay board and the LED boards may be connected by the relaying and connecting parts. In this case, it may be necessary to prepare a second relaying and connecting part for relaying and connecting the relay board and the electric power supply boards.

(9) In the foregoing embodiments, the light source side connectors are mounted on the LED mount surface of the LED boards. However, the light source side connectors may be mounted on the opposite side of the LED boards to the LED mount surface; namely, the LED boards may be of the double-side mount type.

(10) The first embodiment may be combined with the first through third modifications, as appropriate. Namely, a plurality of holding structures may be provided for holding the first connector portion with respect to the chassis or the light source side connectors.

(11) In the foregoing embodiments, the light source side connectors are disposed side by side with the LEDs positioned at the ends of the LED boards in the long side direction with respect to the Z-axis direction. The present invention may also include a configuration in which the light source side connectors are disposed side by side with the LEDs positioned closer to the center than the LEDs positioned at the ends, with respect to the Z-axis direction.

(12) In the foregoing embodiments, the light source side connectors are disposed side by side with the LEDs on the LED boards along the Z-axis direction; namely, the light source side connectors are substantially aligned with the LEDs with respect to the X-axis direction. The present invention also includes a configuration in which the light source side connectors are displaced from the LEDs with respect to the X-axis direction. In this case, the present invention includes a configuration in which, for example, the light source side connectors are displaced from the LEDs positioned at the ends of the LED boards in the long side direction to be even closer to the ends.

(13) In the foregoing embodiments, the relaying and connecting parts include the electric wire portion and the connector portions. However, an FPC (flexible printed circuit board) may be used as a relaying and connecting part. The FPC may include a terminal portion exposed on an end portion thereof. The exposed terminal portion is configured to conductively contact with the terminal portion of the light source side connectors or the electric power supply side connectors when the end portion of the FPC is inserted into the light source side connectors or the electric power supply side connectors. Thus, the connection structure of the relaying and connecting parts with respect to the light source side connectors or the electric power supply side connectors is not limited to the connector portions with the synthetic resin housing.

(14) In the foregoing embodiments, the relaying and connecting parts include the electric wire portion and the connector portions. The present invention includes a configuration in which the electric wire portion is omitted and the connector portions with a synthetic resin housing are provided with engaging portions at both ends thereof for engagement with the light source side connectors and the electric power supply side connectors.

(15) In the foregoing embodiments, the LED boards are made of a metal. However, the material of the LED boards may include a synthetic resin material (such as epoxy resin) or a ceramic material. Similarly, the chassis may be made of a synthetic resin.

(16) In the second embodiment, the adjacent LED boards are connected by the inter-board connectors. The present invention includes a configuration in which electric wires with the ends thereof soldered to the LED boards are used, instead of the inter-board connectors.

(17) In the foregoing embodiments, the LEDs are of the type including blue LED chips that emit the single color of blue light and configured to emit substantially white light by phosphors. The present invention also includes a configuration in which the LEDs are of the type including LED chips that emit the single color of ultraviolet light (blue-violet light) and configured to emit substantially white light by phosphors.

(18) In the foregoing embodiments, the LEDs are of the type including LED chips that emit the single color of blue light and configured to emit substantially white light by phosphors. However, the present invention also includes a configuration in which the LEDs are of the type including three types of LED chips that respectively emit the light of single color of red, green, or blue. In addition, the present invention also includes a configuration in which the LEDs include three types of LED chips that respectively emit the single color of C (cyan), M (magenta), or Y (yellow).

(19) In the first embodiment, a pair of the LED boards (LEDs) is disposed at the ends of the chassis (light guide member) on the long sides thereof. The present invention also includes a configuration in which, for example, a pair of the LED boards (LEDs) is disposed at the ends of the chassis (light guide member) on the short sides thereof.

(20) Other than (19), the present invention also includes a configuration in which each one pair of LED boards (LEDs) is disposed at the ends of the chassis (light guide member) on the long sides and on the short sides thereof. Conversely, only one LED board (LED) may be disposed at the end of the chassis (light guide member) on one of either the long sides or the short sides thereof.

(21) In the foregoing embodiments, as the switching elements of the liquid crystal display device, TFTs are used. The present invention, however, may be applied to liquid crystal display devices using switching elements other than TFTs (such as thin-film diodes (TFD)). Further, the present invention may be applied not only to a liquid crystal display device for color display but also to a liquid crystal display device for monochrome display.

(22) In the foregoing embodiments, liquid crystal display devices using a liquid crystal panel as a display panel has been described by way of example. The present invention may be applied to display devices using other types of display panels.

(23) In the foregoing embodiments, a television receiver with a tuner has been described by way of example. The present invention may be applied to a display device without a tuner.

EXPLANATION OF SYMBOLS 10, 110: Liquid crystal display device (Display device)
11, 111: Liquid crystal panel (Display panel)
12, 112: Backlight unit (Lighting device)
14, 114: Chassis
14a, 114a: Bottom plate (Bottom portion)
14b, 114b: Side plate (Side portion)
15, 115: Optical member
17, 117: LED (Light source)
18, 118: LED board (Light source board)
18a: Wiring pattern
18b, 118b: Mount surface
19: Light guide member
20, 120: Electric power supply board (Electric power supply unit)
21, 121: Relaying and connecting part
22: First reflection sheet (Reflection member)
23: LED group (Light source group)
24: Light source side connector
25: Light guide member support portion
26: Second reflection sheet (Reflection member)
28: Electric power supply side connector
29, 129: Electric wire portion
30, 130: First connector portion (Connector)
31: Second connector portion (Connector)
32: Relaying and Connecting part attaching portion
33, 133: Hole portion
C: Clearance
TV: Television device

The invention claimed is:

1. A lighting device comprising:
a chassis having a hole;
a light source housed in the chassis;
a relaying and connecting part electrically connected to the light source through the hole from outside the chassis and relaying electric power supply to the light source; and
a covering member covering a clearance between the hole and the relaying and connecting part inserted therein.

2. The lighting device according to claim 1, wherein
the relaying and connecting part includes a flexible electric wire and a connector disposed at an end of the electric wire, and
the connector is inserted into the hole.

3. The lighting device according to claim 2, wherein the covering member is integrally provided to the connector.

4. The lighting device according to claim 3, wherein the covering member has a ring shape surrounding the connector and is fitted to the connector.

5. The lighting device according to claim 2, wherein the connector includes a holding portion locked on a hole edge of the hole to hold the connector onto the chassis.

6. The lighting device according to claim 5, wherein the covering member is abutted on the hole edge on a side opposite to a side on which the holding portion is locked to sandwich the hole edge between the covering member and the holding portion.

7. The lighting device according to claim 1, wherein the covering member is made of an elastic material.

8. The lighting device according to claim 7, wherein the covering member is made of a rubber material.

9. The lighting device according to claim 1, wherein the covering member has a ring shape surrounding the hole.

10. The lighting device according to claim 1, wherein the covering member has light blocking property.

11. The lighting device according to claim 1, further comprising a light source side connector arranged in the chassis and connected to the light source and facing the hole,
wherein the relaying and connecting part is fitted and connected to the light source side connector through the hole.

12. The lighting device according to claim 11, wherein the relaying and connecting part has a connection portion that is connected to the light source side connector and the light source side connector has a concave shape conforming to the connection portion.

13. The lighting device according to claim 11, further comprising a light source board having the light source mounted thereon,
wherein the light source side connector is mounted on the light source board.

14. The lighting device according to claim 13, wherein the light source and the light source side connector are mounted on a common surface of the light source board.

15. The lighting device according to claim 13, wherein
the light source includes a plurality of light sources,
the light source board has an elongated shape having the light sources disposed along a long side thereof, and
the light source side connector is disposed at an end portion of the light source board in the long side direction.

16. The lighting device according to claim 1, further comprising a light guide member having an end portion disposed to face the light source.

17. The lighting device according to claim 16, further comprising a light source board having the light source mounted thereon,
wherein the light source board includes a light source mount surface facing the end portion of the light guide member.

18. The lighting device according to claim 17, wherein
the light source board has an elongated shape extending along the end portion of the light guide member,
the light source includes a plurality of light sources, and
the light sources are disposed along a long side of the light source board.

19. A display device comprising:
the lighting device according to claim 1; and
a display panel providing a display by utilizing light from the lighting device.

20. A television device comprising the display device according to claim 19.

* * * * *